(12) United States Patent
Ishii

(10) Patent No.: US 9,227,504 B2
(45) Date of Patent: Jan. 5, 2016

(54) HYBRID VEHICLE DRIVING SYSTEM, HYBRID VEHICLE, AND DRIVING METHOD

(75) Inventor: Noriaki Ishii, Ikoma (JP)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 1171 days.

(21) Appl. No.: 12/642,407

(22) Filed: Dec. 18, 2009

(65) Prior Publication Data

US 2010/0198439 A1 Aug. 5, 2010

(30) Foreign Application Priority Data

Jan. 30, 2009 (JP) .................................. 2009-020767

(51) Int. Cl.
| | | |
|---|---|---|
| *B60K 6/445* | (2007.10) | |
| *B60W 10/06* | (2006.01) | |
| *B60W 10/08* | (2006.01) | |
| *B60W 20/00* | (2006.01) | |

(52) U.S. Cl.
CPC ................ *B60K 6/445* (2013.01); *B60W 10/06* (2013.01); *B60W 10/08* (2013.01); *B60W 20/00* (2013.01); *B60L 2200/26* (2013.01); *B60L 2240/441* (2013.01); *B60L 2240/443* (2013.01); *B60L 2240/486* (2013.01); *B60W 2510/0638* (2013.01); *B60W 2510/0657* (2013.01); *B60W 2540/10* (2013.01); *B60W 2710/0644* (2013.01); *B60W 2710/1061* (2013.01); *Y02T 10/6239* (2013.01); *Y02T 10/6286* (2013.01); *Y02T 10/6295* (2013.01)

(58) Field of Classification Search
CPC ...... B60K 6/445; B60W 10/06; B60W 10/08; B60W 20/00

USPC .................................. 701/22; 180/65.1–65.8
See application file for complete search history.

(56) References Cited

U.S. PATENT DOCUMENTS

| | | | | |
|---|---|---|---|---|
| 3,791,473 A | * | 2/1974 | Rosen ........................ 180/65.26 |
| 4,313,080 A | * | 1/1982 | Park .............................. 320/123 |
| 4,723,410 A | * | 2/1988 | Otters ............................. 60/518 |
| 4,760,701 A | * | 8/1988 | David ............................. 60/595 |

(Continued)

FOREIGN PATENT DOCUMENTS

| | | |
|---|---|---|
| DE | 94 22 162 U1 | 7/1998 |
| DE | 1020060 44 427 A1 | 4/2008 |

(Continued)

OTHER PUBLICATIONS

European Patent Office; Extended European Search Report; Mar. 21, 2011; 5 pgs.

(Continued)

*Primary Examiner* — Fadey Jabr
*Assistant Examiner* — Aaron L Troost
(74) *Attorney, Agent, or Firm* — Foley & Lardner LLP

(57) ABSTRACT

When a driver turns on an accelerator, a CPU permits revolution of planetary gears, and a motor rotates a ring gear to drive wheels. Then, when the driver turns off the accelerator, the CPU calculates a target RPM to be output by a Stirling engine according to a depression amount and a depression time of the accelerator. When the RPM output by the Stirling engine reaches close to the target RPM, the revolution of the planetary gears is inhibited, the operation of the motor is stopped, and the Stirling engine rotates the ring gear via a sun gear and the planetary gears to drive the wheels.

22 Claims, 20 Drawing Sheets

(56) References Cited

U.S. PATENT DOCUMENTS

| | | | |
|---|---|---|---|
| 5,172,784 A * | 12/1992 | Varela, Jr. | 180/65.245 |
| 5,311,739 A | 5/1994 | Clark | |
| 5,410,998 A | 5/1995 | Paul et al. | |
| 5,664,635 A * | 9/1997 | Koga et al. | 180/65.245 |
| 5,781,700 A * | 7/1998 | Puskorius et al. | 706/14 |
| 5,801,497 A * | 9/1998 | Shamoto et al. | 318/139 |
| 5,806,617 A * | 9/1998 | Yamaguchi | 180/65.235 |
| 5,842,534 A * | 12/1998 | Frank | 180/65.25 |
| 5,864,770 A * | 1/1999 | Ziph et al. | 701/110 |
| 5,936,312 A | 8/1999 | Koide et al. | |
| 5,969,624 A * | 10/1999 | Sakai et al. | 340/636.1 |
| 6,116,363 A * | 9/2000 | Frank | 180/65.25 |
| 6,148,784 A | 11/2000 | Masberg et al. | |
| 6,170,587 B1 * | 1/2001 | Bullock | 180/69.6 |
| 6,203,468 B1 * | 3/2001 | Nitta et al. | 477/5 |
| 6,242,873 B1 * | 6/2001 | Drozdz et al. | 318/139 |
| 6,340,847 B1 * | 1/2002 | Kawabata et al. | 290/40 C |
| 6,691,807 B1 * | 2/2004 | Bhavsar et al. | 180/65.21 |
| 7,058,502 B2 * | 6/2006 | Rodgers | 701/104 |
| 7,273,120 B2 * | 9/2007 | Tabata | 180/65.265 |
| 7,290,627 B1 * | 11/2007 | Gardner | 180/65.1 |
| 7,518,254 B2 * | 4/2009 | Donnelly et al. | 290/40 C |
| 7,552,003 B2 * | 6/2009 | Suzuki et al. | 701/51 |
| 7,608,011 B2 * | 10/2009 | Grabowski et al. | 477/5 |
| 7,667,347 B2 * | 2/2010 | Donnelly et al. | 307/10.1 |
| 7,695,402 B2 * | 4/2010 | Yang | 477/5 |
| 7,695,403 B2 * | 4/2010 | Yang | 477/5 |
| 7,726,130 B2 * | 6/2010 | McDowell | 60/716 |
| 7,730,870 B2 * | 6/2010 | Michelini et al. | 123/295 |
| 7,768,233 B2 * | 8/2010 | Lin et al. | 320/132 |
| 7,918,759 B2 * | 4/2011 | Yang | 477/5 |
| 7,918,760 B2 * | 4/2011 | Yang | 477/5 |
| 7,918,761 B2 * | 4/2011 | Yang | 477/5 |
| 7,992,662 B2 * | 8/2011 | King et al. | 180/65.22 |
| 8,033,106 B2 * | 10/2011 | Gierer et al. | 60/456 |
| 8,046,142 B2 * | 10/2011 | Morris et al. | 701/51 |
| 8,050,821 B2 * | 11/2011 | Morris et al. | 701/37 |
| 8,140,230 B2 * | 3/2012 | Haggerty et al. | 701/54 |
| 8,346,416 B2 * | 1/2013 | Liu et al. | 701/22 |
| 8,370,010 B2 * | 2/2013 | Imamura et al. | 701/22 |
| 8,387,730 B2 * | 3/2013 | Bouchon | 180/65.265 |
| 2001/0017227 A1 * | 8/2001 | Amano et al. | 180/65.2 |
| 2002/0063002 A1 | 5/2002 | Lasson | |
| 2003/0098187 A1 * | 5/2003 | Phillips et al. | 180/65.3 |
| 2004/0030469 A1 * | 2/2004 | MacBain | 701/22 |
| 2004/0035113 A1 * | 2/2004 | Hanada et al. | 60/698 |
| 2004/0088103 A1 * | 5/2004 | Itow et al. | 701/110 |
| 2005/0266957 A1 * | 12/2005 | Kamijo et al. | 477/3 |
| 2006/0048988 A1 * | 3/2006 | Dreibholz et al. | 180/213 |
| 2006/0260853 A1 * | 11/2006 | Ando et al. | 180/65.3 |
| 2007/0012493 A1 * | 1/2007 | Jones | 180/65.3 |
| 2008/0041648 A1 * | 2/2008 | Gardner | 180/65.2 |
| 2008/0109142 A1 * | 5/2008 | Endo | 701/54 |
| 2008/0185198 A1 * | 8/2008 | Jones | 180/65.2 |
| 2008/0236911 A1 * | 10/2008 | Yamamoto et al. | 180/65.2 |
| 2009/0030568 A1 * | 1/2009 | Amano et al. | 701/22 |
| 2009/0062063 A1 * | 3/2009 | Yamanaka et al. | 477/5 |
| 2009/0240387 A1 * | 9/2009 | Kawai et al. | 701/22 |
| 2009/0242301 A1 * | 10/2009 | McClanahan et al. | 180/69.6 |
| 2010/0063658 A1 * | 3/2010 | Martin et al. | 701/22 |

FOREIGN PATENT DOCUMENTS

| | | |
|---|---|---|
| JP | 10-268946 | 10/1998 |
| JP | 10-289021 | 10/1998 |
| JP | 2001-054205 | 2/2001 |
| JP | 2001-164960 | 6/2001 |
| JP | 2002-050585 A | 2/2002 |
| JP | 2003-239804 | 8/2003 |
| JP | 2005-319924 | 11/2005 |
| JP | 2006-017232 | 1/2006 |
| JP | 2006-094617 | 4/2006 |
| JP | 2006-273305 | 10/2006 |
| JP | 2007-095845 A | 4/2007 |

OTHER PUBLICATIONS

Office Action for Japanese Appl. No. 2009-020767 mailed Sep. 7, 2010 (with English translation).

Whalen, S. et al., "Design, fabrication and testing of the P3 micro heat engine," Sensors & Actuators: A. Physical, vol. 104, Issue 3, pp. 290-298, May 15, 2003 Available at: http://www.sciencedirect.com/science/article/pii/S0924424703000323.

* cited by examiner

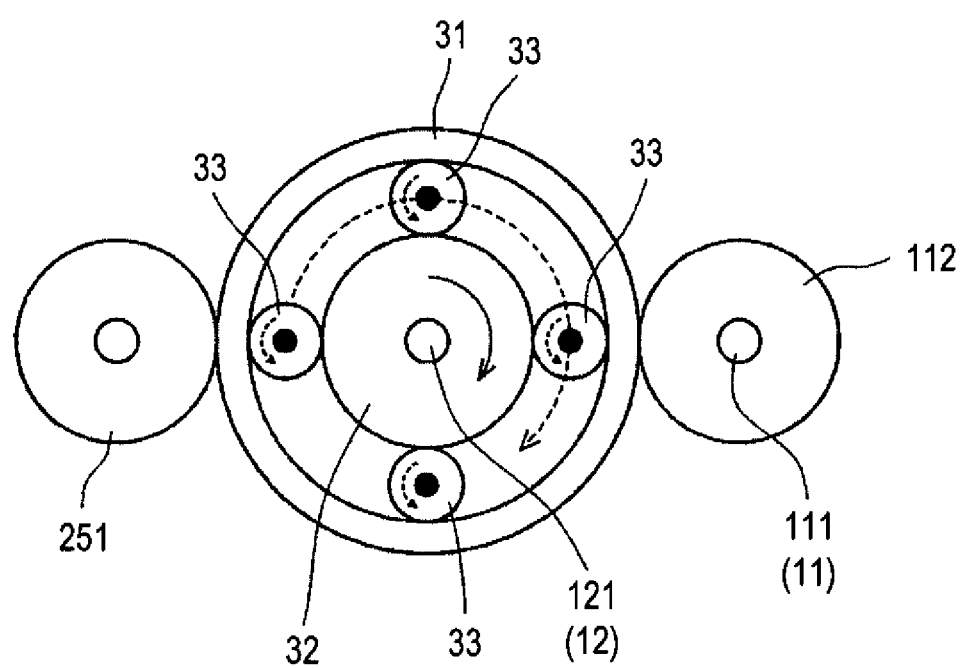

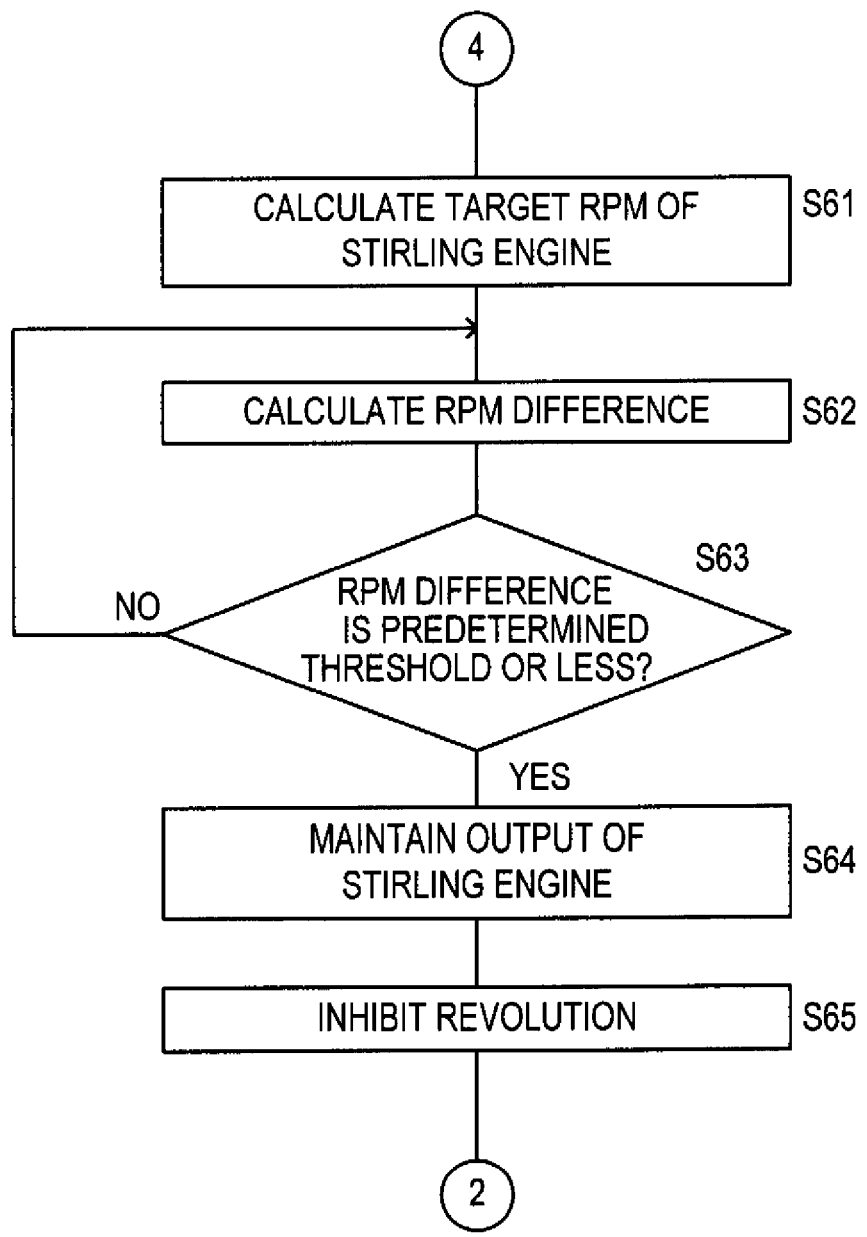

HYBRID VEHICLE DRIVING SYSTEM, HYBRID VEHICLE, AND DRIVING METHOD

CROSS-REFERENCE TO RELATED APPLICATIONS

This Nonprovisional application claims priority under 35 U.S.C. §119(a) on Patent Application No. 2009-20767 filed in Japan on Jan. 30, 2009, the entire contents of which are hereby incorporated by reference.

BACKGROUND

1. Technical Field

The present disclosure relates to a hybrid vehicle driving system that transmits power output by two types of power sources having different characteristics to wheels, a hybrid vehicle, and a driving method.

2. Description of Related Art

In recent years, a hybrid vehicle including two types of power sources having different characteristics has been put to practical use. The hybrid vehicle is configured so as to run with power output by the two types of power sources optimally combined depending on circumstances to make the most of advantages of the power sources and compensate for disadvantages thereof.

The conventional hybrid vehicle includes an internal combustion engine and an electric motor. Thus, for example, the internal combustion engine with low efficiency is stopped in a low speed or light load region and wheels are driven by the electric motor, thereby improving fuel efficiency.

However, the conventional hybrid vehicle has a problem that disadvantages of the internal combustion engine cannot be overcome such as high noise due to combustion and explosion of fuel, limitation on types of fuel, or difficulty in reducing exhaust gas containing pollutants.

The external combustion engine, unlike the internal combustion engine, lowers noise due to combustion, accepts a wide range of types and forms (gas, liquid, or solid) of fuel, and allows combustion under an optimum condition, and thus has an advantage of easily reducing exhaust of pollutants.

However, the external combustion engine has a disadvantage that a reaction rate of output adjustment is lower than that of the internal combustion engine.

Thus, an electric vehicle including an external combustion engine and an electric motor has been proposed (see Japanese Patent Application Laid-Open No. 2003-239804).

The electric vehicle described in Japanese Patent Application Laid-Open No. 2003-239804 is configured so that electric power generated by a generator interlocked with the external combustion engine is supplied to the electric motor, and power output by the electric motor is transmitted to wheels. In such an electric vehicle, the electric motor that is high in reaction rate of output adjustment drives the wheels, and the external combustion engine constantly drives the generator. Thus, there is no need for sudden output adjustment of the external combustion engine.

SUMMARY

However, in the electric vehicle described in Japanese Patent Application Laid-Open No. 2003-239804, the power output by the external combustion engine is never transmitted to the wheels. Thus, there is a problem of loss arising for the power output by the external combustion engine to be once converted into electric power.

A hybrid vehicle driving system according to a first embodiment is a hybrid vehicle driving system comprising: an electric motor; an external combustion engine; and a power transmission section that selectively transmits one or both of power output by said external combustion engine and power output by said electric motor to a wheel, wherein said power transmission section includes: an output calculation device that calculates an output value to be output by said external combustion engine depending on power to be transmitted to said wheel; an output comparison device that compares a calculation result of said output calculation device with an output value output by said external combustion engine; and a power selection device that selects power to be transmitted to said wheel according to a comparison result of said output comparison device.

In a hybrid vehicle driving system according to a second embodiment, said output comparison device compares a calculation result using the calculation result of said output calculation device and the output value output by said external combustion engine with a predetermined threshold, said power selection device selects power output by said external combustion engine as power to be transmitted to said wheels when the comparison result of said output comparison device shows that an absolute value of a difference between the calculation result of said output calculation device and the output value output by said external combustion engine is a predetermined threshold or less, and said power selection device selects at least power output by said electric motor as power to be transmitted to said wheels when the comparison result of said output comparison device shows that a subtraction result obtained by subtracting the output value output by said external combustion engine from the calculation result of said output calculation device is larger than a predetermined threshold.

In a hybrid vehicle driving system according to a third embodiment, said power selection device selects power output by said electric motor as power to be transmitted to said wheel when the comparison result of said output comparison device shows that a subtraction result obtained by subtracting the output value output by said external combustion engine from the calculation result of said output calculation device is larger than a predetermined threshold.

In a hybrid vehicle driving system according to a fourth embodiment, said power selection device selects power output by said electric motor as power to be transmitted to said wheel when the comparison result of said output comparison device shows that a subtraction result obtained by subtracting the calculation result of said output calculation device from the output value output by said external combustion engine is larger than a predetermined threshold.

In a hybrid vehicle driving system according to a fifth embodiment, said power selection device selects power output by said electric motor as power to be transmitted to said wheel, and controls said electric motor so as to operate as a generator when the comparison result of said output comparison device shows that a subtraction result obtained by subtracting the calculation result of said output calculation device from the output value output by said external combustion engine is larger than a predetermined threshold.

In a hybrid vehicle driving system according to a sixth embodiment, said power transmission section further includes: a planetary gear mechanism using a first gear to which the power output by said electric motor is transmitted, a second gear to which the power output by said external combustion engine is transmitted, and a third gear that transmits the power transmitted to said second gear to said first gear during rotation stop or rotational movement stop; and a switching portion that switches rotation or rotational movement of said third gear on/off, the power transmitted to said first gear is transmitted to said wheel, and said power selection device controls said switching portion so as to stop the rotation or the rotational movement of said third gear and controls said electric motor so as to stop the output of the power when selecting the power output by said external combustion engine as the power to be transmitted to said wheel, and said power selection device controls said switching portion so as to cause the rotation or the rotational movement of said third gear and controls said electric motor so as to output the power when selecting the power output by said electric motor as the power to be transmitted to said wheel.

A hybrid vehicle driving system according to a seventh embodiment further includes a generator that is interlocked with said external combustion engine and generates electric power to be supplied to said electric motor.

A hybrid vehicle according to an eighth embodiment is a hybrid vehicle comprising: a hybrid vehicle driving system of the present disclosure; and a wheel driven by said hybrid vehicle driving system.

A driving method according to a ninth embodiment is a method for driving a driving system including an electric motor, an external combustion engine, and a power transmission section that selectively transmits one or both of power output by said external combustion engine and power output by said electric motor to a wheel, said method comprising: calculating an output value to be output by said external combustion engine depending on power to be transmitted to said wheel; comparing a calculation result with an output value output by said external combustion engine; and selecting power to be transmitted to said wheel according to a comparison result.

In the hybrid vehicle driving system, the hybrid vehicle, and the driving method, the two types of power sources for driving the wheel, and the power transmission section including the output calculation device, the output comparison device, and the power selection device are provided.

The output calculation device calculates the output value to be output by the external combustion engine depending on power to be transmitted to the wheel. The output value to be output by the external combustion engine is an output value required for driving the wheel using only the power output by the external combustion engine.

The output comparison device compares the calculation result of the output calculation device (that is, the output value to be output by the external combustion engine) with the output value output by the external combustion engine.

For example, when the external combustion engine has a rotating output shaft, the output calculation device calculates an RPM and/or a torque value of the output shaft as the output value to be output by the external combustion engine, and the output comparison device compares the calculation result of the output calculation device with the RPM and/or the torque value of the output shaft.

The external combustion engine is low in reaction rate of output adjustment, and it takes a long time to output a required output value. Meanwhile, the electric motor is high in reaction rate of output adjustment, and can output a required output value in a short time.

Thus, for example, when the external combustion engine does not output a necessary and sufficient output value, the wheel is desirably driven by the power output by the electric motor, and when the external combustion engine outputs a necessary and sufficient output value, the wheel is desirably driven by the power output by the external combustion engine. For this purpose, the power to be transmitted to the wheel needs to be properly selected.

Thus, the power selection device selects power to be transmitted to the wheel according to the comparison result of the output comparison device. In this case, the comparison result of the output comparison device is used for determining whether the external combustion engine outputs a necessary and sufficient output value.

The power selection device selects the power to be transmitted to the wheel, and thus only the power output by the external combustion engine is transmitted to the wheel, only the power output by the electric motor is transmitted to the wheel, or both the power output by the external combustion engine and the power output by the electric motor are transmitted to the wheel. In other words, any of a state where the wheel is driven by only the external combustion engine, a state where the wheel is driven by only the electric motor, and a state where the wheel is driven by the external combustion engine and the electric motor in cooperation is selected.

In the hybrid vehicle driving system, the output comparison device compares the calculation result using the calculation result of the output calculation device and the output value output by the external combustion engine with the predetermined threshold.

The case where the comparison result of the output comparison device shows that the absolute value of the difference between the calculation result of the output calculation device and the output value output by the external combustion engine is a predetermined threshold or less is a case where the output value to be output by the external combustion engine is substantially equal to the output value output by the external combustion engine. In this case, the power selection device selects the power output by the external combustion engine as the power to be transmitted to the wheel.

Specifically, when the external combustion engine outputs the necessary and sufficient output value, the wheel is driven using only the power output by the external combustion engine. Thus, the entire output required for driving the wheel can be covered by only the output of the external combustion engine.

Meanwhile, the case where the comparison result of the output comparison device shows that the subtraction result obtained by subtracting the output value output by the external combustion engine from the calculation result of the output calculation device is larger than the predetermined threshold is a case where the output value output by the external combustion engine is significantly smaller than the output value to be output by the external combustion engine. In this case, the power selection device selects the power output by the electric motor, or selects both the power output by the electric motor and the power output by the external combustion engine as the power to be transmitted to the wheel.

Specifically, when the output value output by the external combustion engine is insufficient, the wheel is driven using at least the power output by the electric motor until the external combustion engine outputs the necessary and sufficient output value. Thus, while the external combustion engine is increasing the output value, the entire output required for driving the wheel is covered by only the output of the electric motor, or the external combustion engine and the electric motor cooperate and the insufficient output of the external combustion engine is compensated for by the output of the electric motor.

When both the power output by the external combustion engine and the power output by the electric motor are selected as the power to be transmitted to the wheel, and the output value output by the external combustion engine is extremely smaller than the output value to be output by the external combustion engine, the power selection device increases the output value output by the electric motor. In this case, the wheel is driven mainly by the power output by the electric motor. Meanwhile, the power selection device reduces the output value output by the electric motor when the output value output by the external combustion engine is close to the output value to be output by the external combustion engine. In this case, the wheel is driven mainly by the power output by the external combustion engine.

In this hybrid vehicle driving system, when the comparison result of the output comparison device shows that the subtraction result obtained by subtracting the output value output by the external combustion engine from the calculation result of the output calculation device is larger than the predetermined threshold, that is, when the output value output by the external combustion engine is significantly smaller than the output value to be output by the external combustion engine, the power selection device selects the power output by the electric motor as the power to be transmitted to the wheel.

Specifically, when the output value output by the external combustion engine is insufficient, the wheel is driven using only the power output by the electric motor until the external combustion engine outputs the necessary and sufficient output value. Thus, while the external combustion engine is increasing the output value, the entire output required for driving the wheel is covered by only the output of the electric motor.

In the hybrid vehicle driving system, when the comparison result of the output comparison device shows that the subtraction result obtained by subtracting the calculation result of the output calculation device from the output value output by the external combustion engine is larger than the predetermined threshold, that is, when the output value output by the external combustion engine is significantly larger than the output value to be output by the external combustion engine, the power selection device selects the power output by the electric motor as the power to be transmitted to the wheel.

Specifically, when the output value output by the external combustion engine is excessive, the wheel is driven using only the power output by the electric motor until the external combustion engine outputs the necessary and sufficient output value. Thus, while the external combustion engine is decreasing the output value, the entire output required for driving the wheel is covered by only the output of the electric motor.

In the hybrid vehicle driving system, when the comparison result of the output comparison device shows that the subtraction result obtained by subtracting the calculation result of the output calculation device from the output value output by the external combustion engine is larger than the predetermined threshold, that is, when the output value output by the electric motor is significantly larger than the output value to be output by the external combustion engine, the power selection device selects the power output by the electric motor as the power to be transmitted to the wheel.

Then, the power selection device controls the electric motor so as to operate as a generator.

Generally, the electric motor drives the wheel, but when the electric motor is operated as the generator, the wheel drives the electric motor. Thus, rotation resistance of the electric motor during power generation acts as a braking force to the wheel. In other words, the wheel is driven by negative power output by the electric motor.

Electric power generated by the electric motor that operates as the generator is, for example, supplied to a resistor and consumed (dynamic brake), or supplied to a rechargeable battery and recovered (regenerative brake).

In the hybrid vehicle driving system, the power transmission section further includes the planetary gear mechanism and the switching portion.

The power output by the electric motor is transmitted to the first gear (for example, outer ring gear) of the planetary gear mechanism, and the power transmitted to the first gear is transmitted to the wheel.

The power output by the external combustion engine is transmitted to the second gear (for example, sun gear) of the planetary gear mechanism.

The switching portion switches rotation or rotational movement of the third gear on/off (for example, rotational movement of the planetary gear).

During rotation stop or rotational movement stop of the third gear of the planetary gear mechanism, the power transmitted to the second gear is transmitted to the first gear.

The power selection device controls the switching portion so as to stop the rotation or the rotational movement of the third gear and controls the electric motor so as to stop the output of the power when selecting the power output by the external combustion engine as the power to be transmitted to the wheel. Thus, the power output by the external combustion engine is transmitted to the wheel via the first and second gears of the planetary gear mechanism.

Meanwhile, the power selection device controls the switching portion so as to cause the rotation or the rotational movement of the third gear and controls the electric motor so as to output the power when selecting the power output by the electric motor as the power to be transmitted to the wheel.

During the rotation or the rotational movement of the third gear, the power transmitted to the second gear is not transmitted to the first gear. Thus, only the power output by the electric motor is transmitted to the wheel via the first gear of the planetary gear mechanism. Specifically, even when the wheel is driven by the electric motor, there is no need to stop the output of the external combustion engine.

The hybrid vehicle driving system further includes the generator that is interlocked with the external combustion engine and generates electric power to be supplied to the electric motor.

The electric power generated by the generator may be directly supplied to the electric motor, or supplied to the electric motor via a rechargeable battery that supplies power to the electric motor.

BRIEF DESCRIPTION OF THE DRAWINGS

FIGS. 9A to 9C are schematic front views illustrating an operation (rightward revolution) of the planetary gear mechanism included in the hybrid vehicle driving system according to the embodiment of the present disclosure;

FIG. 13 is a flowchart showing the procedure of the vehicle driving process executed by the hybrid vehicle driving system according to the embodiment of the present disclosure.

DETAILED DESCRIPTION

The present disclosure will be described in detail based on the drawings showing an embodiment thereof.

Figure 1:
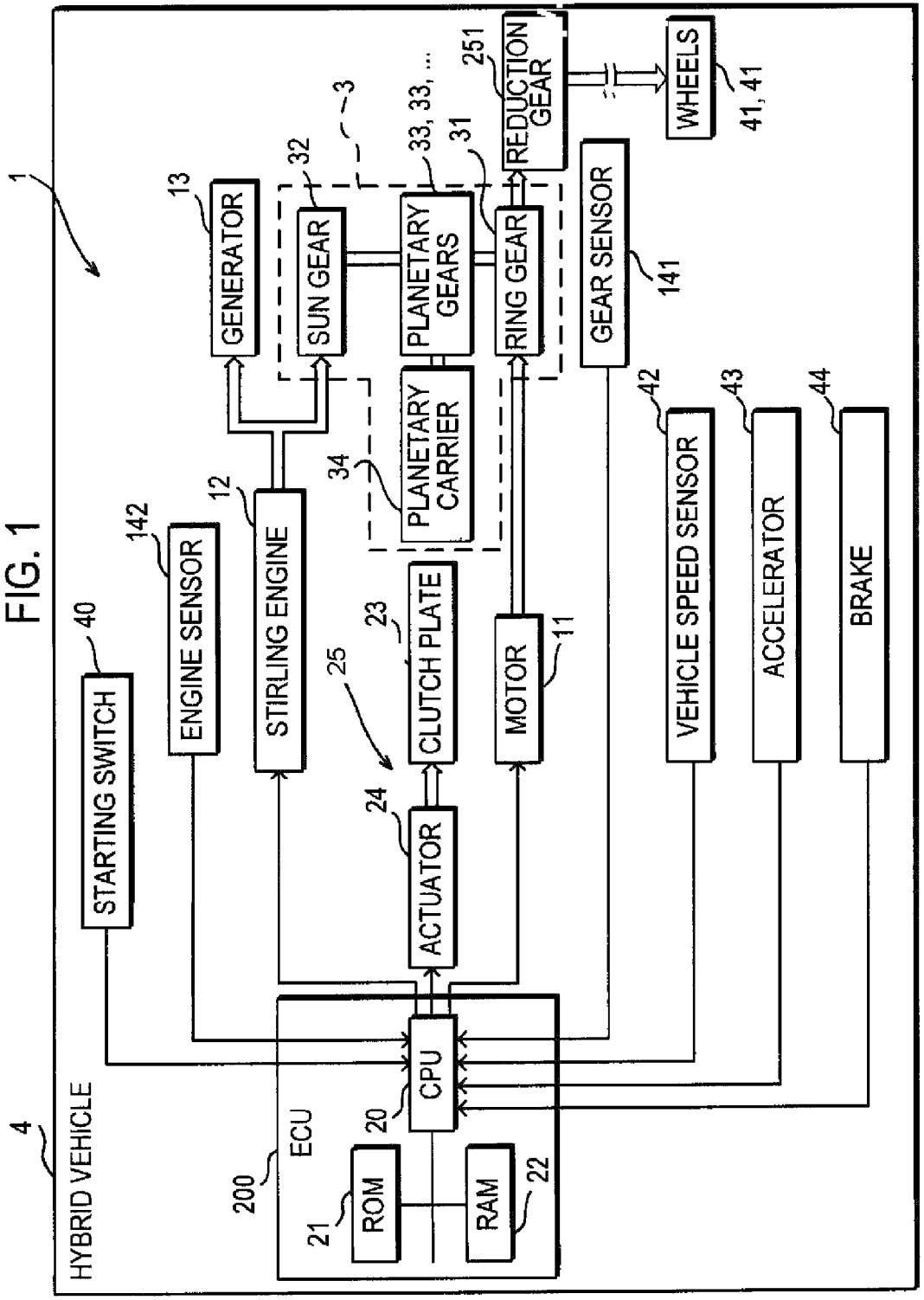
FIG. 1 is a block diagram showing an essential part configuration of a hybrid vehicle according to an embodiment of the present disclosure.
Figure 2:
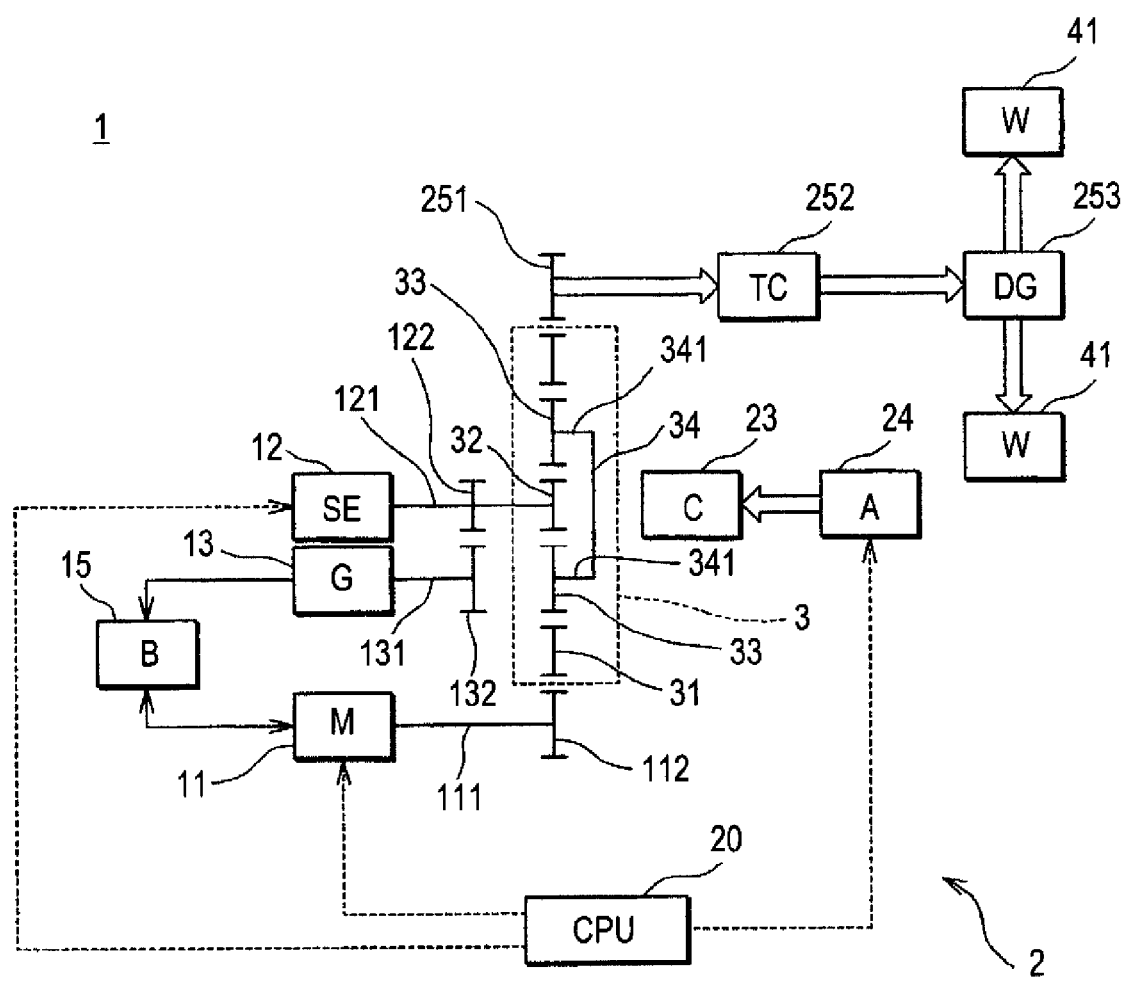
FIG. 2 is a schematic illustrative view showing an essential part configuration of a hybrid vehicle driving system according to the embodiment of the present disclosure.

FIG. 1 is a block diagram showing an essential part configuration of a hybrid vehicle 4 according to an embodiment of the present disclosure, and FIG. 2 is a schematic illustrative view showing an essential part configuration of a hybrid vehicle driving system 1 according to the embodiment of the present disclosure.

The hybrid vehicle 4 according to this embodiment is a front-wheel-drive four-wheel vehicle, but not limited to this. For example, the hybrid vehicle 4 may be various vehicles with two to four wheels, an agricultural vehicle, a railway vehicle, a play vehicle such as a go-cart, or the like.

The hybrid vehicle 4 includes at least a hybrid vehicle driving system 1 having an CPU (Central Processing Unit) 20, a starting switch 40, wheels 41 and 41, a vehicle speed sensor 42, an accelerator 43, and a brake 44. A driving method according to the embodiment of the present disclosure is used in the hybrid vehicle driving system 1.

A driver of the hybrid vehicle 4 turns on the starting switch 40 when starting driving the hybrid vehicle 4. The driver turns off the starting switch 40 when finishing driving the hybrid vehicle 4.

The starting switch 40 turned on outputs an ON signal indicating that the starting switch 40 is ON to the CPU 20. The starting switch 40 turned off stops outputting the ON signal to the CPU 20.

The wheels 41 and 41 are two front wheels of the hybrid vehicle 4 and driven by the hybrid vehicle driving system 1.

The vehicle speed sensor 42 detects a vehicle speed of the hybrid vehicle 4 in time series, and provides the detection result to the CPU 20 in the hybrid vehicle driving system 1.

The accelerator 43 includes an accelerator pedal, and a potentiometer that detects a depression amount of the accelerator pedal in time series, and the detection result of the potentiometer is provided to the CPU 20.

The brake 44 includes a brake pedal, and a potentiometer that detects a depression amount of the brake pedal in time series, and the detection result of the potentiometer is provided to the CPU 20. When the brake 44 is operated, a brake mechanism such as a disk brake or a drum brake operates to decrease the RPM (revolutions per minute) of the wheels 41 and 41, but descriptions on this brake mechanism will be herein omitted.

The accelerator 43 or the brake 44 may be manually operated by the driver.

The driver operates the accelerator 43 or the brake 44 to input a desired vehicle speed to the CPU 20.

More specifically, to increase the vehicle speed of the hybrid vehicle 4, the driver continues increasing the depression amount of the accelerator 43 until the vehicle speed reaches the desired vehicle speed, or completely depresses the accelerator 43. This state will be referred below to as turning on the accelerator 43.

When the vehicle speed of the hybrid vehicle 4 reaches the desired vehicle speed, the driver maintains the accelerator 43 at a constant depression amount under a maximum amount. This state will be referred below to as turning off the accelerator 43.

To decrease the vehicle speed of the hybrid vehicle 4, the driver depresses the brake 44 until the vehicle speed reaches the desired vehicle speed after finishing depressing the accelerator 43. This state will be referred below to as turning on the brake 44.

When the vehicle speed of the hybrid vehicle 4 reaches the desired vehicle speed, the driver finishes depressing the brake 44. This state will be referred below to as turning off the brake 44.

The hybrid vehicle driving system 1 includes a motor 11 that functions as an electric motor, a Stirling engine 12 that functions as an external combustion engine, a generator 13, a gear sensor 141 and an engine sensor 142, a rechargeable battery 15, and a power transmission section 2. Not limited to the Stirling engine 12, the hybrid vehicle driving system 1 may include other external combustion engines (for example, steam engine).

The Stirling engine 12 is ON while not-shown fuel is burned to heat a working fluid, and OFF while the working fluid is not heated. In this embodiment, the Stirling engine 12 rotates an output shaft 121 rightward. However, when a force to rotate the output shaft 121 is equal to or lower than rotation resistance of the output shaft 121 even while the fuel is burned, the output shaft 121 is not rotated.

The RPM and the torque value of the output shaft 121 of the Stirling engine 12 are referred below to as the RPM and the torque value of the Stirling engine 12. The RPM and the torque value of the Stirling engine 12 are adjusted by adjusting temperature and/or pressure of the working fluid.

The motor 11 in this embodiment includes a DC motor, and is ON while electric power is supplied from the rechargeable battery 15, and OFF while the electric power is not supplied therefrom. In this embodiment, the motor 11 rotates an output shaft 111 rightward.

The RPM and the torque value of the output shaft 111 of the motor 11 are referred below to as the RPM and the torque value of the motor 11. The RPM and the torque value of the motor 11 are adjusted by adjusting a current value and/or a voltage value of electric power supplied to the motor 11.

When the motor 11 is ON and power is externally supplied to the output shaft 111, a counter electromotive force generated by the motor 11 is output to the outside of the motor 11 and supplied to the rechargeable battery 15. At this time, the motor 11 operates as a generator.

When the motor 11 is OFF, the motor 11 does not operate as the generator and the output shaft 111 runs idle even if the power is externally supplied to the output shaft 111.

The power transmission section 2 is configured to selectively transfer one of power output by the motor 11 and power output by the Stirling engine 12 to the wheels 41 and 41. For this purpose, the power transmission section 2 includes an ECU (Electronic Control Unit) 200 including the CPU 20, a planetary gear mechanism 3, a clutch plate 23 and an actuator 24 that function as a switching portion 25, a reduction gear 251, a torque converter 252, and a differential device 253.

The planetary gear mechanism 3 includes a ring gear 31 formed with an inner tooth portion and an outer tooth portion, a sun gear 32 formed with an outer tooth portion, a plurality of (four in this embodiment) planetary gears 33, 33, . . . each formed with an outer tooth portion, and a planetary carrier 34. The ring gear 31, the sun gear 32, and the planetary gears 33, 33, . . . function as a first gear, a second gear, and a third gear.

As shown in FIG. 2, the ring gear 31, the sun gear 32, and the planetary carrier 34 rotate on the same shaft.

The planetary carrier 34 includes four rotating shafts 341, 341, . . . provided at regular intervals in a rotational direction of the planetary carrier 34. Each rotating shaft 341 is provided in parallel with a rotating shaft of the planetary carrier 34.

Each planetary gear 33 is rotatably supported by each rotating shaft 341 of the planetary carrier 34, and meshes with both the inner tooth portion of the ring gear 31 and the sun gear 32.

The planetary gears 33, 33, . . . rotate and revolve between the ring gear 31 and the sun gear 32 when the planetary carrier 34 is rotatable, but just rotate and do not revolve when the planetary carrier 34 is not rotatable. A rotational direction of the planetary carrier 34 is equal to a revolving direction of the planetary gears 33, 33, . . . . The rotation of the planetary gears 33, 33, . . . means rotation of each planetary gear 33, and revolution of the planetary gears 33, 33, . . . means rotational movement of each planetary gear 33.

To disable the rotation of the planetary carrier 34, the actuator 24 presses the clutch plate 23 against the planetary carrier 34 using, for example, an elastic restoring force of an elastic body to connect the clutch plate 23 to the planetary carrier 34. To allow rotation of the planetary carrier 34, the actuator 24, for example, deforms the elastic body to draw the clutch plate 23 away from the planetary carrier 34 to separate the clutch plate 23 from the planetary carrier 34. Specifically, the clutch plate 23 and the actuator 24 switch revolution of the planetary gears 33, 33, . . . on/off.

In this embodiment, only two types of states where the planetary carrier 34 does not rotate at all (a state where rotation is impossible) and a state where the planetary carrier 34 freely rotates (a state where rotation is possible) are considered, and a state where the planetary carrier 34 rotates in contact with the clutch plate 23 (a state where rotation is not impossible; a so-called half clutch) is not considered.

A state where the clutch plate 23 is connected to the planetary carrier 34 to disable revolution of the planetary gears 33, 33, . . . is referred below to as inhibiting revolution of the planetary gears 33, 33, . . . . Also, a state where the clutch plate 23 is separated from the planetary carrier 34 to allow revolution of the planetary gears 33, 33, . . . is referred below to as permitting revolution of the planetary gears 33, 33, . . . .

As such, the power transmission section 2 in this embodiment switches permission/inhibition of the revolution of the planetary gears 33, 33, . . . by separation/connection of the clutch plate 23 from/to the planetary carrier 34, which is an extremely simple configuration. Also, simple control is performed to the actuator 24 to switch separation/connection of the clutch plate 23 from/to the planetary carrier 34.

The number of teeth of the inner tooth portion of the ring gear 31 is N times (N is a positive real number) the number of teeth of the sun gear 32. When the revolution of the planetary gears 33, 33, . . . is inhibited, the RPM of the ring gear 31 is 1/N times the RPM of the sun gear 32, and the torque value of the ring gear 31 is N times the torque value of the sun gear 32. However, the rotational direction of the ring gear 31 is opposite from the rotational direction of the sun gear 32.

For simplifying the descriptions, it is assumed that the RPM and the torque value of the ring gear 31 are equal to the RPM and the torque value of the sun gear 32 (that is, N=1).

To the ring gear 31, the motor 11 is connected so as to be able to transmit power. Thus, a worm gear 112 is fitted and secured on the output shaft 111 of the motor 11, and the outer tooth portion formed on the worm gear 112 meshes with the outer tooth portion on the ring gear 31. The ring gear 31 also serves as a worm wheel of the worm gear 112. The motor 11 rotates rightward, and thus the ring gear 31 rotates leftward. When the ring gear 31 rotates while the motor 11 is OFF, the motor 11 runs idle with the rotation of the ring gear 31.

When the number of teeth of the worm gear 112 is M times (M is a positive real number) the number of teeth of the outer tooth portion of the ring gear 31, the RPM of the ring gear 31 is 1/M times the RPM of the motor 11, and the torque value of the ring gear 31 is M times the torque value of the motor 11. For simplifying the descriptions, it is assumed that the RPM and the torque value of the motor 11 is equal to the RPM and the torque value of the ring gear 31 (that is, M=1).

To the sun gear 32, the Stirling engine 12 is connected so as to be able to transmit power. Thus, the sun gear 32 is fitted and secured on the output shaft 121 of the Stirling engine 12. The Stirling engine 12 rotates rightward, and thus the sun gear 32 also rotates rightward. The RPM and the torque value of the Stirling engine 12 are equal to the RPM and the torque value of the sun gear 32.

With the left rotation of the ring gear 31 and/or the right rotation of the sun gear 32, each planetary gear 33 rotates leftward.

When the revolution of the planetary gears 33, 33, . . . is inhibited, power transmitted from the Stirling engine 12 to the sun gear 32 is transmitted to the ring gear 31 via the planetary gears 33, 33, . . . .

Meanwhile, when the revolution of the planetary gears 33, 33, . . . is permitted, the power transmitted from the Stirling engine 12 to the sun gear 32 is not transmitted to the ring gear 31.

Also, when the revolution of the planetary gears 33, 33, . . . is permitted, the planetary gears 33, 33, . . . revolve with the rotation of the ring gear 31 and/or the sun gear 32. More specifically, when the RPM of the ring gear 31 is higher than the RPM of the sun gear 32, the planetary gears 33, 33, . . . are mainly drawn by the rotation of the ring gear 31 and revolve leftward. Meanwhile, when the RPM of the ring gear 31 is lower than the RPM of the sun gear 32, the planetary gears 33, 33, . . . are mainly drawn by the rotation of the sun gear 32 and revolve rightward.

Thus, it can be said that pressing the clutch plate 23 against the planetary carrier 34 to inhibit the revolution of the planetary gears 33, 33, . . . is applying torque braking the revolution of the planetary gears 33, 33, . . . to the planetary carrier 34.

When the RPM of the ring gear 31 is equal to the RPM of the sun gear 32, the planetary gears 33, 33, . . . do not revolve.

The reduction gear 251 is formed with an outer tooth portion.

The worm gear 112 and also the outer tooth portion of the reduction gear 251 mesh with the outer tooth portion of the ring gear 31.

The power transmitted from the motor 11 to the ring gear 31, or the power transmitted from the Stirling engine 12 via the sun gear 32 and the planetary gears 33, 33, . . . to the ring gear 31 is transmitted to the reduction gear 251, the torque converter 252, and the differential device 253 in this order, and then transmitted to the wheels 41 and 41. The reduction gear 251 reduces the RPM of the transmitted power to increase the torque value, the torque converter 252 adjusts the RPM and the torque value of the transmitted power, and the differential device 253 distributes the transmitted power to the wheels 41 and 41 so as to equalize the torque value.

The vehicle speed is proportional to the RPM of the wheels 41 and 41, and the RPM of the wheels 41 and 41 is proportional to the RPM of the ring gear 31. Specifically, the vehicle speed is proportional to the RPM of the ring gear 31.

The generator 13 interlocks with the Stirling engine 12 and generates electric power to be supplied to the motor 11. Thus, an external gear 122 fitted and secured on the output shaft 121 of the Stirling engine 12 meshes with an external gear 132 fitted and secured on an input shaft 131 of the generator 13, and an output terminal of the generator 13 is electrically connected to the rechargeable battery 15. Thus, the electric power generated by the generator 13 is supplied to the rechargeable battery 15.

The rechargeable battery 15 stores electric power supplied from each of the motor 11 and the generator 13. The rechargeable battery 15 supplies the stored electric power to the motor 11.

As a result, the electric power generated by each of the motor 11 and the generator 13 is once stored in the rechargeable battery 15 and then supplied to the motor 11.

The electric power generated by the generator 13 may be directly supplied to the motor 11 without via the rechargeable battery 15.

Also, the electric power generated by the motor 11 may be consumed by a not-shown resistor without being supplied to the rechargeable battery 15, or charging of the rechargeable battery 15 and consumption by the resistor may be switched according to a voltage value of the rechargeable battery 15.

Further, the rechargeable battery 15 may supply electric power to an electrical apparatus other than the motor 11.

In this embodiment, the generator 13 is configured to always generate electric power while the Stirling engine 12 is operating, but not limited to such a configuration. For example, a clutch that continues/interrupts transmission of power from the Stirling engine 12 to the generator 13 may be provided between the Stirling engine 12 and the generator 13 to appropriately switch between a case where the power output by the Stirling engine 12 is transmitted to both the generator 13 and the sun gear 32 and a case where the power output by the Stirling engine 12 is transmitted to only the sun gear 32.

The gear sensor 141 shown in FIG. 1 detects the RPM of the ring gear 31 in time series, and provides the detection result to the CPU 20.

The engine sensor 142 detects the RPM of the Stirling engine 12 in time series, and provides the detection result to the CPU 20.

The hybrid vehicle driving system 1 is not limited to the configuration including the gear sensor 141, but for example, the hybrid vehicle driving system 1 may include a sensor that detects the RPM of the motor 11. The hybrid vehicle driving system 1 is not limited to the configuration including the engine sensor 142, but for example, the hybrid vehicle driving system 1 may include a sensor that detects the RPM of the sun gear 32. Further, the hybrid vehicle driving system 1 is not limited to the configuration to detect and provide the RPM to the CPU 20, but for example, the hybrid vehicle driving system 1 may detect and provide the torque value to the CPU 20.

The ECU 200 includes the CPU 20 and also a ROM 21 and a RAM 22.

The ROM 21 stores a control program for controlling the hybrid vehicle driving system 1 and data such as a function and a table required for various calculations.

The CPU 20 is a control center of the hybrid vehicle driving system 1, and uses the RAM 22 as a work area and performs various processes according to the control program and the data stored in the ROM 21.

Specifically, the CPU 20 determines whether the starting switch 40 is ON or OFF according to whether an ON signal is input from the starting switch 40 via a not-shown interface.

The CPU 20 obtains signals indicating various detection results in time series from the vehicle speed sensor 42, the accelerator 43, the brake 44, the gear sensor 141, and the engine sensor 142 via a not-shown interface, and executes predetermined determination and calculation based on the detection result indicated by the obtained signals.

For example, the CPU 20 determines whether the accelerator 43 (or brake 44) is ON or OFF based on the detection result input from the accelerator 43 (or brake 44) in time series.

Further, the CPU 20 controls operations of the motor 11, the Stirling engine 12, and the clutch plate 23.

More specifically, when the operation of the motor 11 is controlled, the CPU 20 inputs/outputs a predetermined control signal via a not-shown interface to/from a not-shown motor driver that adjusts a voltage value and a current value of the electric power supplied to the motor 11 to control the RPM and the torque value of the motor 11.

When the operation of the Stirling engine 12 is controlled, the CPU 20 inputs/outputs a predetermined control signal via a not-shown interface to/from a not-shown engine driver that adjusts temperature and pressure of the working fluid of the Stirling engine 12 to control the RPM and the torque value of the Stirling engine 12.

When the operation of the clutch plate 23 is controlled, the CPU 20 controls the operation of the actuator 24 to switch connection/separation of the clutch plate 23 to/from the planetary carrier 34.

The motor 11 is high in reaction rate of the output adjustment, and the Stirling engine 12 is low in reaction rate of the output adjustment. Thus, the motor 11 can output a necessary and sufficient amount of power to be transmitted to the wheels 41 and 41 in a short time, but it takes a long time for the Stirling engine 12 to output the necessary and sufficient amount of power to be transmitted to the wheels 41 and 41.

Thus, the CPU 20 starts the output adjustment of the Stirling engine 12 when the accelerator 43 (or brake 44) is turned on. Then, the CPU 20 operates the motor 11 and permits the revolution of the planetary gears 33, 33, . . . until the Stirling engine 12 starts outputting the necessary and sufficient amount of power to be transmitted to the wheels 41 and 41. Thus, only the power output by the motor 11 is transmitted to the wheels 41 and 41. The power output by the Stirling engine 12 is not transmitted to the wheels 41 and 41.

When the motor 11 operates and the revolution of the planetary gears 33, 33, . . . is permitted, the RPM of the ring gear 31 is proportional to the RPM of the motor 11 (equal in this embodiment). Thus, the vehicle speed is proportional to the RPM of the motor 11.

When the Stirling engine 12 then starts outputting the necessary and sufficient amount of power to be transmitted to the wheels 41 and 41, the operation of the motor 11 is stopped and the revolution of the planetary gears 33, 33, . . . is inhibited. Thus, only the power output by the Stirling engine 12 is transmitted to the wheels 41 and 41. The power output by the motor 11 is not transmitted to the wheels 41 and 41.

When the operation of the motor 11 is stopped, and the revolution of the planetary gears 33, 33, . . . is inhibited, the RPM of the ring gear 31 is proportional to the RPM of the Stirling engine 12 (equal in this embodiment). Thus, the vehicle speed is proportional to the RPM of the Stirling engine 12.

In this embodiment, as the output value to be output by the Stirling engine 12, the RPM to be output by the Stirling engine 12 (hereinafter referred to as a target RPM of the Stirling engine 12) is used. When the operation of the motor 11 is stopped and the revolution of the planetary gears 33, 33, . . . is inhibited, and the Stirling engine 12 outputs the target RPM, the hybrid vehicle 4 runs at a speed desired by the driver.

Thus, whether the Stirling engine 12 starts outputting the necessary and sufficient amount of power to be transmitted to the wheels 41 and 41 is determined by whether the RPM of the Stirling engine 12 reaches a predetermined range including the target RPM of the Stirling engine 12. In other words, it is determined by whether an absolute value of a difference between the target RPM of the Stirling engine 12 and the RPM output by the Stirling engine 12 is a predetermined threshold or less. The predetermined threshold is a positive real number. It is because a predetermined threshold of "0" is a too strict determination condition. The hybrid vehicle driving system 1 is not limited to the configuration with a constant predetermined threshold. For example, the predetermined threshold may be changeable according to some conditions (for example, the present vehicle speed).

The ROM 21 stores an RPM calculation function or an RPM calculation table or the like for calculating the target RPM of the Stirling engine 12 based on an depression amount of an accelerator pedal (or brake pedal) by the driver, and an elapsed time (hereinafter referred to as a depression time) between when the accelerator 43 (or brake 44) is switched on and when the accelerator 43 (or brake 44) is switched off. The CPU 20 uses the RPM calculation function or the RPM calculation table or the like stored in the ROM 21 to calculate the target RPM of the Stirling engine 12 based on the detection result input from the accelerator 43 (or brake 44) in time series.

A multiple types of different RPM calculation functions or a multiple types of different RPM calculation tables may be stored in the ROM 21. In this case, for example, when a running mode is switched to any of a standard mode, a high power mode, and a low power mode, an RPM calculation function or an RPM calculation table according to the switched mode is used.

As described above, in the hybrid vehicle driving system 1 according to this embodiment, the motor 11 is connected to the ring gear 31, and the wheels 41 and 41 are connected to the ring gear 31 via the reduction gear 251, the torque converter 252, and the differential device 253. Further, the Stirling engine 12 is connected to the sun gear 32, and the generator 13 is interlocked with the Stirling engine 12. Further, the clutch plate 23 is connected to/separated from the planetary carrier 34 to switch the rotational movement of the planetary gears 33, 33, . . . on/off.

However, the configuration of the hybrid vehicle driving system 1 is not limited to that exemplified in this embodiment.

For example, the hybrid vehicle driving system 1 may have a configuration in which the motor 11 and the wheels 41 and 41 are each connected to the ring gear 31, the clutch plate 23 is connected to/separated from the sun gear 32, and the Stirling engine 12 is connected to the planetary gears 33, 33, . . . via the planetary carrier 34.

Alternatively, the hybrid vehicle driving system 1 may have a configuration in which the Stirling engine 12 is connected to the ring gear 31, the motor 11 and the wheels 41 and 41 are each connected to the sun gear 32, and the clutch plate 23 is connected to/separated from the planetary carrier 34 to switch the rotational movement of the planetary gears 33, 33, . . . on/off.

Alternatively, the hybrid vehicle driving system 1 may have a configuration in which the clutch plate 23 is connected to/separated from the ring gear 31, the motor 11 and the wheels 41 and 41 are each connected to the sun gear 32, and the Stirling engine 12 is connected to the planetary gears 33, 33, . . . via the planetary carrier 34.

The hybrid vehicle driving system 1 does not limitedly have the configuration in which the planetary gear mechanism 3 is interposed between the motor 11 and the Stirling engine 12. For example, the hybrid vehicle driving system 1 may have a configuration in which a torque converter different from the torque converter 252 is interposed between the motor 11 and the Stirling engine 12.

Further, the power transmission section 2 may be configured to selectively transmit one or both of the power output by the motor 11 and the power output by the Stirling engine 12 to the wheels 41 and 41. With such a configuration, when both of the power output by the motor 11 and the power output by the Stirling engine 12 are selected, the motor 11 and the Stirling engine 12 cooperate to drive the wheels 41 and 41.

The generator 13 is most desirably directly connected to the Stirling engine 12, but not limited to this. For example, the generator 13 may be connected to any of the various gears 31, 32 and 33 included in the planetary gear mechanism 3. In this case, the power output by the Stirling engine 12 is distributed to the wheels 41 and 41 and the generator 13 via the planetary gear mechanism 3.

FIGS. 3A to 3D, 4A to 4D, 5A to 5D, 6A to 6D and 7A to 7D are characteristic views illustrating cases where the hybrid vehicle 4 starts, accelerates, decelerates, stops, and halts and then restarts. Stopping means that the RPM of the Stirling engine 12 is zero and the vehicle speed of the hybrid vehicle 4 is zero, and halting means that the RPM of the Stirling engine 12 exceeds zero and the vehicle speed is zero. Starting (or restarting) means that the hybrid vehicle 4 having been stopping (or halting) starts running, and increases the vehicle speed to a predetermined speed. Accelerating (or decelerating) means that the hybrid vehicle 4 having been running at a constant speed increases (decreases) the vehicle speed to a predetermined speed.

The abscissa in each of FIGS. 3A to 3D, 4A to 4D, 5A to 5D, 6A to 6D and 7A to 7D represents time t.

The ordinate in each of FIGS. 3A, 4A, 5A, 6A and 7A represents RPM. Herein, forward rotation is indicated by a positive number, and reverse rotation is indicated by a negative number. For the output shaft 111 of the motor 11, the worm gear 112, the output shaft 121 of the Stirling engine 12, the sun gear 32, and the reduction gear 251, right rotation is forward rotation, and for the ring gear 31, each planetary gear 33, and the planetary carrier 34, left rotation is forward rotation. For the revolution of the planetary gears 33, 33, . . . , left rotation is forward rotation, and right rotation is reverse rotation.

In each drawings, the thick broken line indicates the RPM of the ring gear 31 (and the RPM of the motor 11), the solid line indicates the RPM of the sun gear 32 (and the RPM of the Stirling engine 12), and the thin broken line indicates the RPM of the revolution of the planetary gears 33, 33, . . . (the RPM of the planetary carrier 34). The RPM of the revolution of the planetary gears 33, 33, . . . is referred below to as the RPM of the planetary gears 33, 33, . . . .

The ordinate in each of FIGS. 3B, 4B, 5B, 6B and 7B represents the torque supplied to the ring gear 31. Herein, torque (hereinafter referred to as supplied torque) supplied from the motor 11 or the Stirling engine 12 to the ring gear 31 for increasing or maintaining left rotation of the ring gear 31 is indicated by a positive number. Also, torque (hereinafter referred to as braking torque) supplied from the motor 11 to the ring gear 31 for reducing the left rotation of the ring gear 31 is indicated by a negative number.

In each drawing, the broken line indicates the torque value of the motor 11, and the solid lines indicates the torque value of the Stirling engine 12.

The ordinate in each of FIGS. 3C, 4C, 5C, 6C and 7C represents the value of power supplied to the ring gear 31. Herein, power (hereinafter referred to as supplied power) supplied from the motor 11 or the Stirling engine 12 to the ring gear 31 for increasing or maintaining the left rotation of the ring gear 31 is indicated by a positive number. Also, power (hereinafter referred to as braking power) supplied from the motor 11 to the ring gear 31 for reducing the left rotation of the ring gear 31 is indicated by a negative number.

In each drawing, the broken line indicates the power value of the motor 11, and the solid line indicates the power value of the Stirling engine 12.

The ordinate in each of FIGS. 3D, 4D, 5D, 6D and 7D represent torque (hereinafter referred to as inhibition torque) applied to the planetary carrier 34 for inhibiting the revolution of the planetary gears 33, 33, . . . .

Figure 8A:
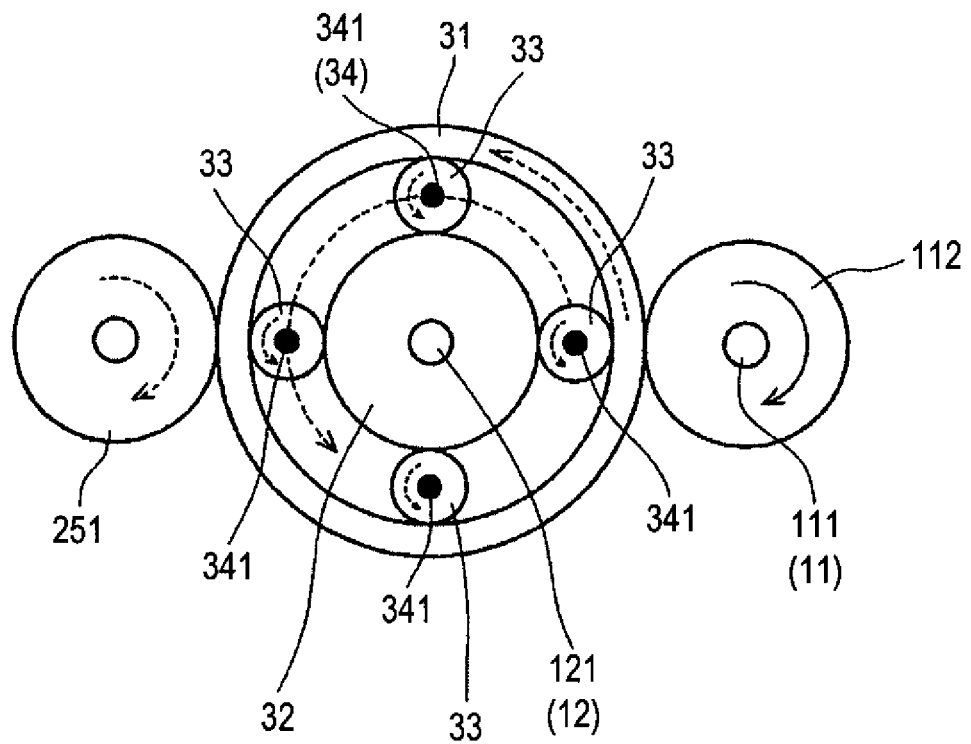
FIGS. 8A to 8C are schematic front views illustrating an operation (leftward revolution or revolution inhibition) of a planetary gear mechanism included in the hybrid vehicle driving system according to the embodiment of the present disclosure.
Figure 8B:
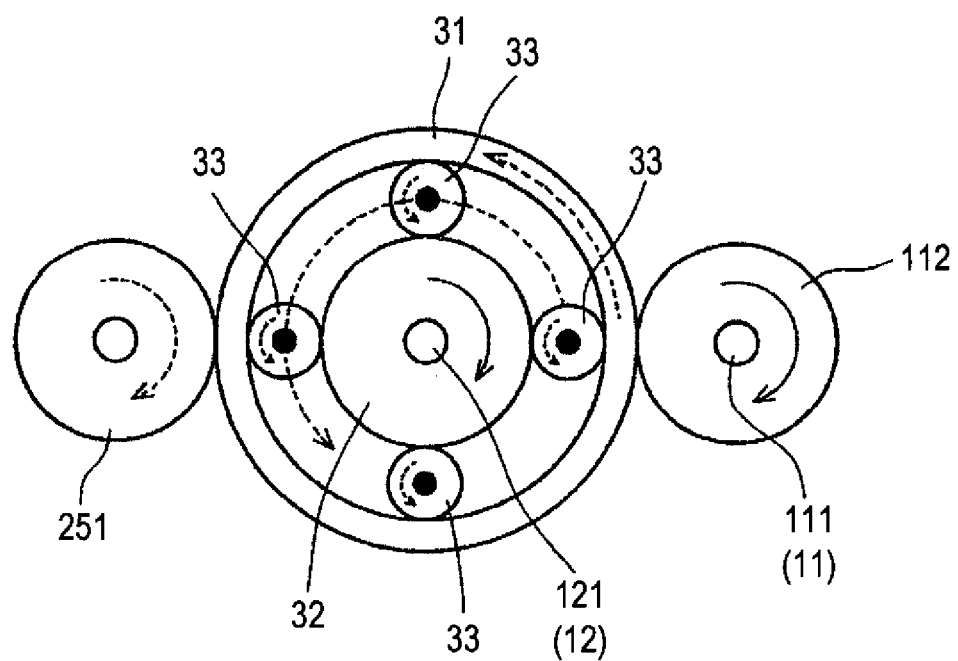
Figure 8C:
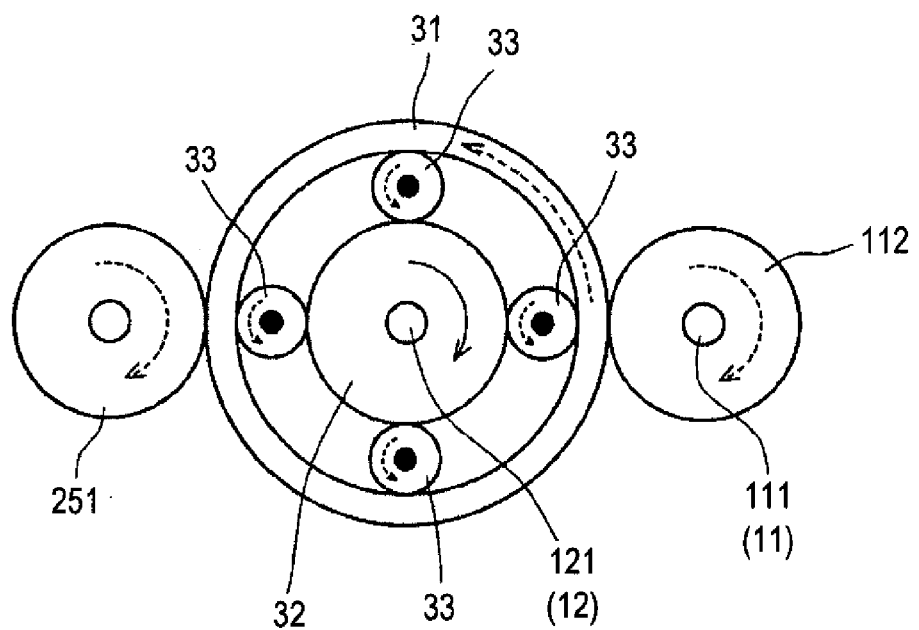
Figure 9A:
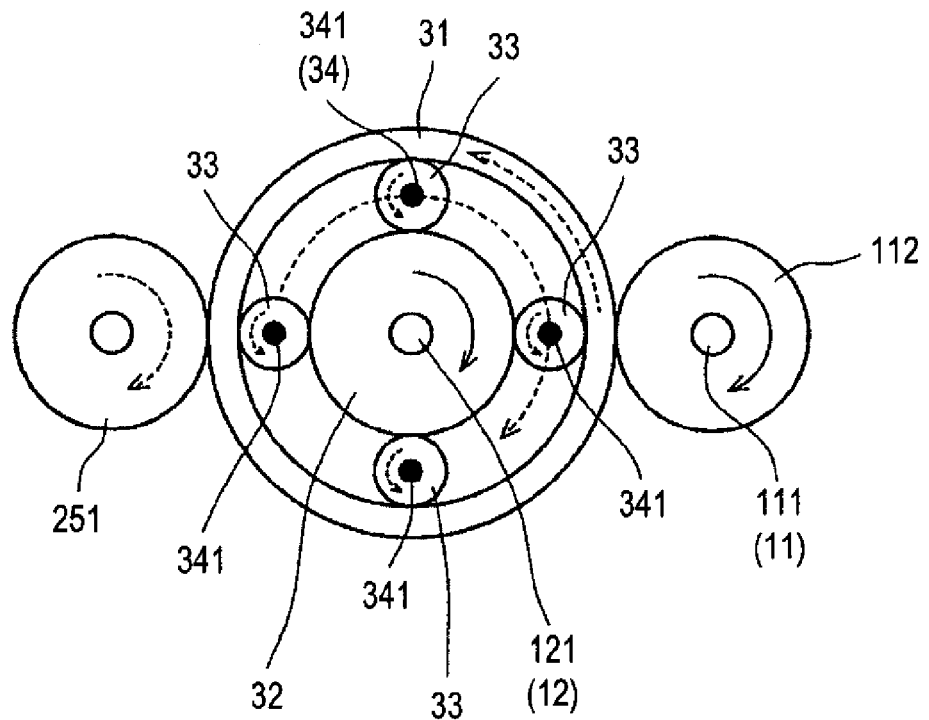
Figure 9B:
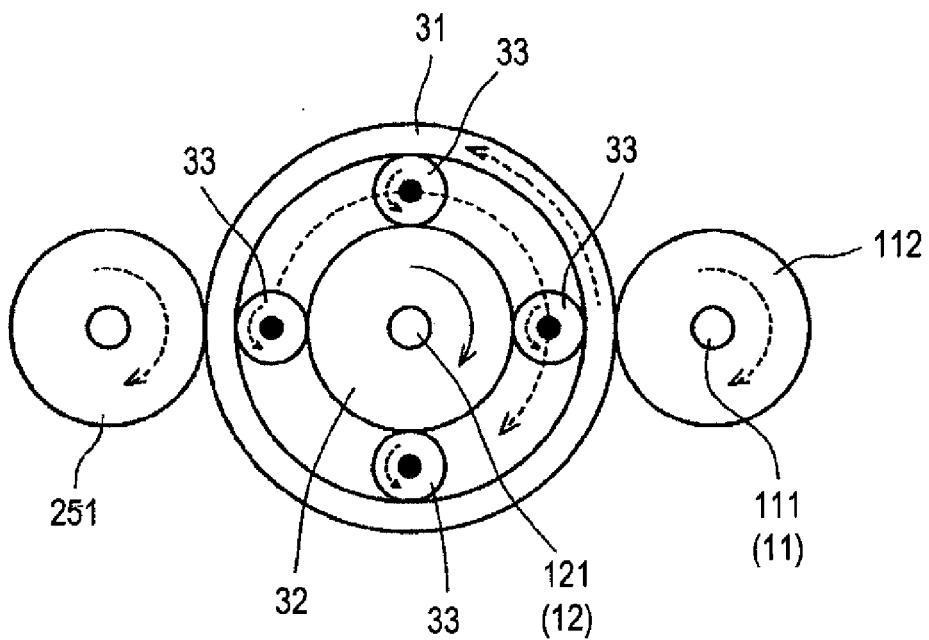

FIGS. 8A to 8C and 9A to 9C are schematic front views illustrating the operation of the planetary gear mechanism 3, FIGS. 8A and 8B show a state where the planetary gears 33, 33, . . . revolve leftward, and FIG. 8C shows a state where the revolution of the planetary gears 33, 33, . . . is inhibited. FIGS. 9A to 9C show a state where the planetary gears 33, 33, . . . revolve rightward.

In each drawing, the solid arrows indicate the rotational directions of the worm gear 112 and the sun gear 32 directly driven by the motor 11 and the Stirling engine 12. The broken arrow indicates the rotational direction or the revolution direction of the gear driven by rotation of the other gears.

Hereinafter, rotation directly driven by the motor 11 or the Stirling engine 12 is referred to as rotation in a driving manner, and rotation driven by rotation of the other gears is referred to as rotation in a driven manner. Rotation that is not differentiated into the rotation in the driving manner and the rotation in the driven manner is simply referred to as rotation.

Further, FIGS. 10 to 13 are flowcharts showing a procedure of a vehicle driving process executed by the hybrid vehicle driving system 1.

The driver turns on the starting switch 40 in an OFF state when starting driving the hybrid vehicle 4. The driver turns off the starting switch 40 in an ON state when getting out of the hybrid vehicle 4.

Figure 10:
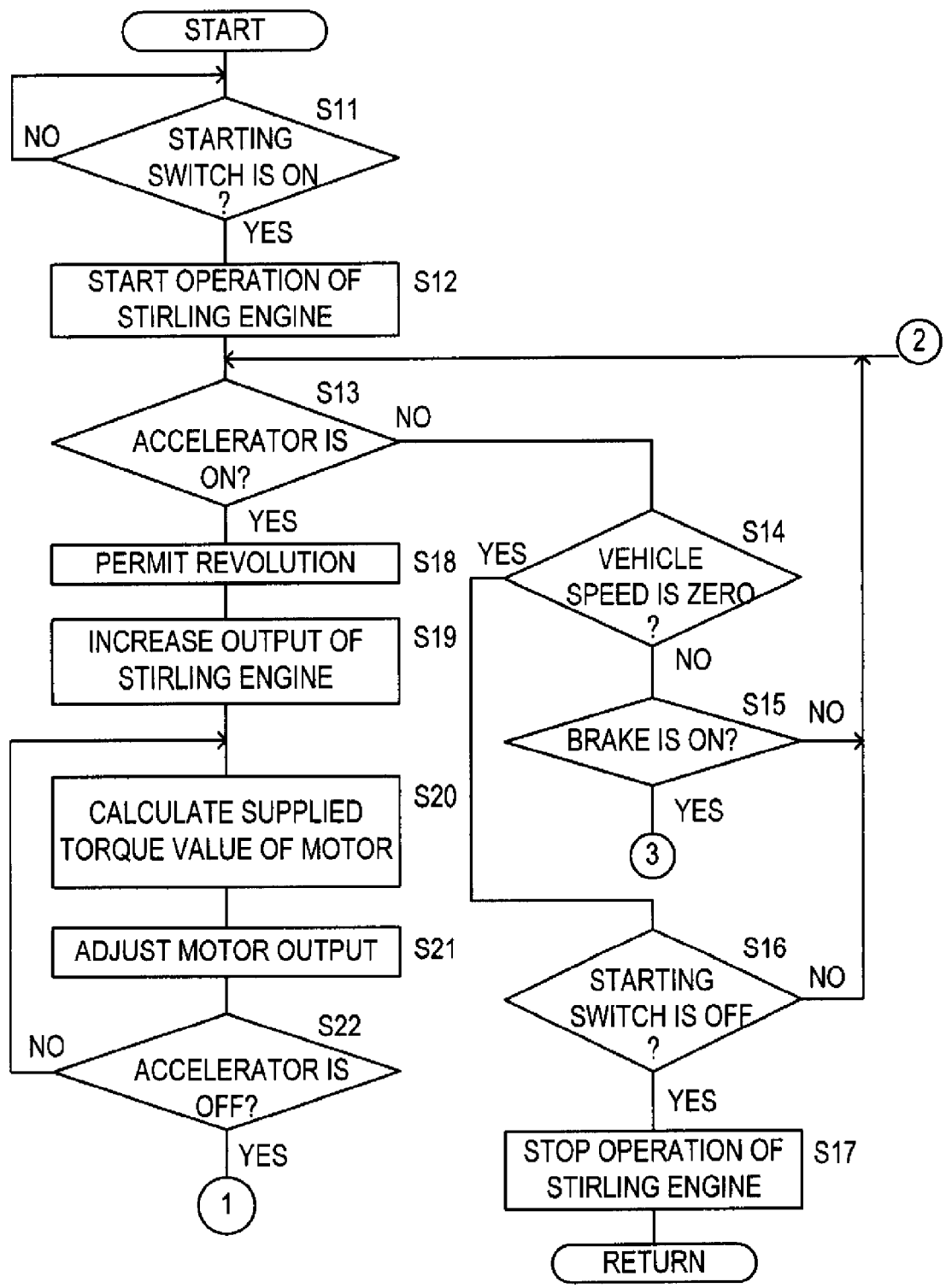
FIG. 10 is a flowchart showing a procedure of a vehicle driving process executed by the hybrid vehicle driving system according to the embodiment of the present disclosure.

As shown in FIG. 10, the CPU 20 determines whether the starting switch 40 is ON (S11). When the starting switch 40 is OFF (NO in S11), the CPU 20 repeatedly executes the process in S11. While the process in S11 is repeatedly executed, the hybrid vehicle 4 is stopped.

When the starting switch 40 is ON (YES in S11), the driver starts driving the hybrid vehicle 4, and thus the CPU 20 first starts the operation of the Stirling engine 12 (S12). In the process in S12, combustion of fuel is started to such an extent that the output shaft 121 of the Stirling engine 12 does not rotate to warm the Stirling engine 12. Thus, when the hybrid vehicle 4 is started, a required time is reduced for the Stirling engine 12 to output a necessary and sufficient output value for driving the wheels 41 and 41.

The Stirling engine 12 during warming may be configured to output an RPM of the order of idling.

Also, if the clutch plate 23 is connected to the planetary carrier 34 by some circumstances before the process in S12 is executed, the CPU 20 may control the operation of the actuator 24 to separate the clutch plate 23 from the planetary carrier 34.

Further, the CPU 20 determines whether the accelerator 43 is ON (S13). When the accelerator 43 is OFF (NO in S13), the CPU 20 determines whether the vehicle speed is zero based on the detection result of the sensor 42 (S14). When the vehicle speed exceeds zero (NO in S14), the CPU 20 determines whether the brake 44 is ON (S15).

When the brake 44 is OFF (NO in S15), the CPU 20 returns the process to S13.

While the processes in S13 to S15 are repeatedly executed, the hybrid vehicle 4 runs at a constant speed.

When the vehicle speed is zero (YES in S14), the CPU 20 determines whether the starting switch 40 is OFF (S16).

When the starting switch 40 is OFF (YES in S16), the driver finishes the operation of the hybrid vehicle 4, and thus the CPU 20 stops the operation of the Stirling engine 12 (S17), and returns the process to S11. By the process in S17, the RPM of the Stirling engine 12 becomes zero. In other words, the hybrid vehicle 4 stops.

When the starting switch 40 is ON (NO in S16), the driver continues the operation of the hybrid vehicle 4, and thus the CPU 20 returns the process to S13.

While the processes in S13, S14 and S16 are repeatedly executed, the hybrid vehicle 4 halts.

When the driver wants to start, restart, or accelerate the hybrid vehicle 4 stopping, halting, or running at a constant speed (that is, wants to increase the vehicle speed of the hybrid vehicle 4), the driver turns on the accelerator 43 with the starting switch 40 ON.

When the accelerator 43 is ON (YES in S13), the CPU 20 permits the revolution of the planetary gears 33, 33, . . . (S18). Thus, the CPU 20 in S18 controls the operation of the actuator 24 to separate the clutch plate 23 from the planetary carrier 34.

Then, the CPU 20 controls the operation of the Stirling engine 12 to start increasing the output (that is, the RPM and the torque value) of the Stirling engine 12 (S19). An increasing gradient of the output of the Stirling engine 12 may be always constant, and for example, the steepness of the increasing gradient may be changed according to the depression amount of the accelerator 43.

Further, the CPU 20 calculates a supplied torque value to be output by the motor 11 (S20). In S20, the CPU 20 calculates a depression amount of the accelerator pedal by the driver and/or changes with time in the depression amount based on the detection result input from the accelerator 43, and calculates the supplied torque value based on the calculation result.

Then, the CPU 20 controls the operation of the motor 11, and adjusts the torque value output by the motor 11 to the supplied torque value calculated in S20 (S21). By the process in S21, the output shaft 111 of the motor 11 is rotated in a driving manner to rotate the ring gear 31 in a driven manner via the worm gear 112.

After the process in S21 is finished, the CPU 20 determines whether the accelerator 43 is OFF based on the detection result input from the accelerator 43 (S22). When the accelerator 43 is ON (NO in S22), the CPU 20 returns the process to S20.

The processes in S20 to S22 are repeated, and thus the hybrid vehicle 4 runs while increasing the vehicle speed.

The driver having turned on the accelerator 43 turns off the accelerator 43 when a desired speed is obtained.

Figure 11:
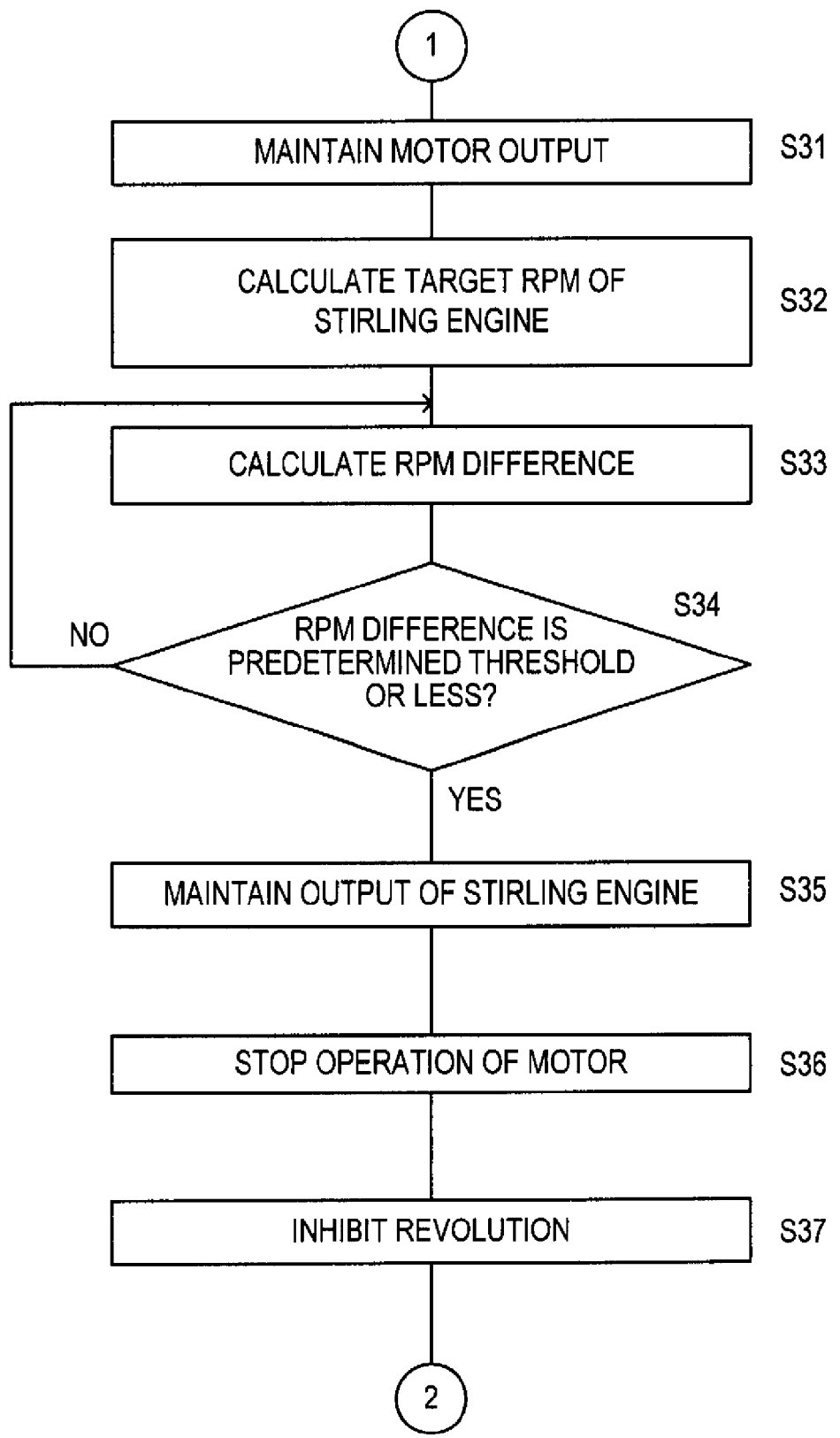
FIG. 11 is a flowchart showing the procedure of the vehicle driving process executed by the hybrid vehicle driving system according to the embodiment of the present disclosure.

When the accelerator 43 is OFF (YES in S22), as shown in FIG. 11, the CPU 20 maintains the torque value output by the motor 11 at the supplied torque value last calculated in S20 (S31).

Between the finish of the process in S31 and execution of a process in S36 described later, the hybrid vehicle 4 runs at a constant speed desired by the driver with the wheels 41 and 41 driven by the power output by the motor 11.

Then, the CPU 20 calculates the target RPM of the Stirling engine 12 (S32). In S32, the CPU 20 calculates the depression amount and the depression time of the accelerator pedal by the driver based on the detection result input from the accelerator 43, and calculates the target RPM based on the calculation result. In this embodiment, the RPM of the Stirling engine 12 is equal to the RPM of the ring gear 31, and thus the target RPM calculated in S32 is equal to the present RPM of the ring gear 31. The CPU 20 in S32 may calculate the target RPM of the Stirling engine 12 based on the present RPM of the ring gear 31 and a gear ratio between the ring gear 31 and the sun gear 32.

Further, the CPU 20 calculates the present RPM of the Stirling engine 12 based on the detection result of the engine sensor 142, and calculates an absolute value of a difference between the calculated RPM and the target RPM calculated in S32 (hereinafter referred to as an RPM difference) (S33).

Then, the CPU 20 determines whether the RPM difference calculated in S33 is a predetermined threshold previously stored in the ROM 21 or less (S34).

When the RPM difference calculated in S33 exceeds the predetermined threshold (NO in S34), that is, when the RPM of the Stirling engine 12 is still lower than the target RPM, the CPU 20 returns the process to S33.

While the processes in S33 and S34 are repeated, the output of the Stirling engine 12 continues increasing.

For example, when the predetermined threshold is too small or a sampling time of the engine sensor 142 is too long, or the like, the RPM of the Stirling engine 12 becomes too much higher than the target RPM and the RPM difference may exceed the predetermined threshold. However, in this case, it is sufficient that the CPU 20 reduces the output of the Stirling engine 12.

When the RPM difference calculated in S33 is the predetermined threshold or less (YES in S34), that is, when the RPM of the Stirling engine 12 reaches close to the target RPM, the CPU 20 maintains the output of the Stirling engine 12 at the present output (S35), and stops the operation of the motor 11 (S36). By the process in S36, rotational movement of the ring gear 31 is transmitted to the output shaft 111 of the motor 11 via the worm gear 112 to rotate the output shaft 111 in a driven manner. In other words, the motor 11 runs idle.

Then, the CPU 20 inhibits the revolution of the planetary gears 33, 33, . . . (S37). Thus, the CPU 20 in S37 controls the operation of the actuator 24 to connect the clutch plate 23 to the planetary carrier 34.

After the process in S37 is finished, the CPU 20 returns the process to S13 shown in FIG. 10.

Between the finish of the process in S37 and further execution of the process in S18 or execution of a process in S41 described later, the hybrid vehicle 4 runs at a constant speed desired by the driver with the wheels 41 and 41 driven by the power output by the Stirling engine 12.

When the accelerator 43 is turned on again, for example, between the determination as YES in S22 and the execution of the process in S37, it is sufficient that the CPU 20 interrupts the process under execution and then executes the processes in S19 and thereafter. When the brake 44 is turned on, for example, between the determination as YES in S22 and the execution of the process in S37, it is sufficient that the CPU 20 interrupts the process under execution and then executes processes in S42 and thereafter described later.

When the driver wants to stop, halt, or decelerate the hybrid vehicle 4 running at the constant speed (that is, wants to reduce the vehicle speed of the hybrid vehicle 4), the driver turns on the brake 44.

Figure 12:
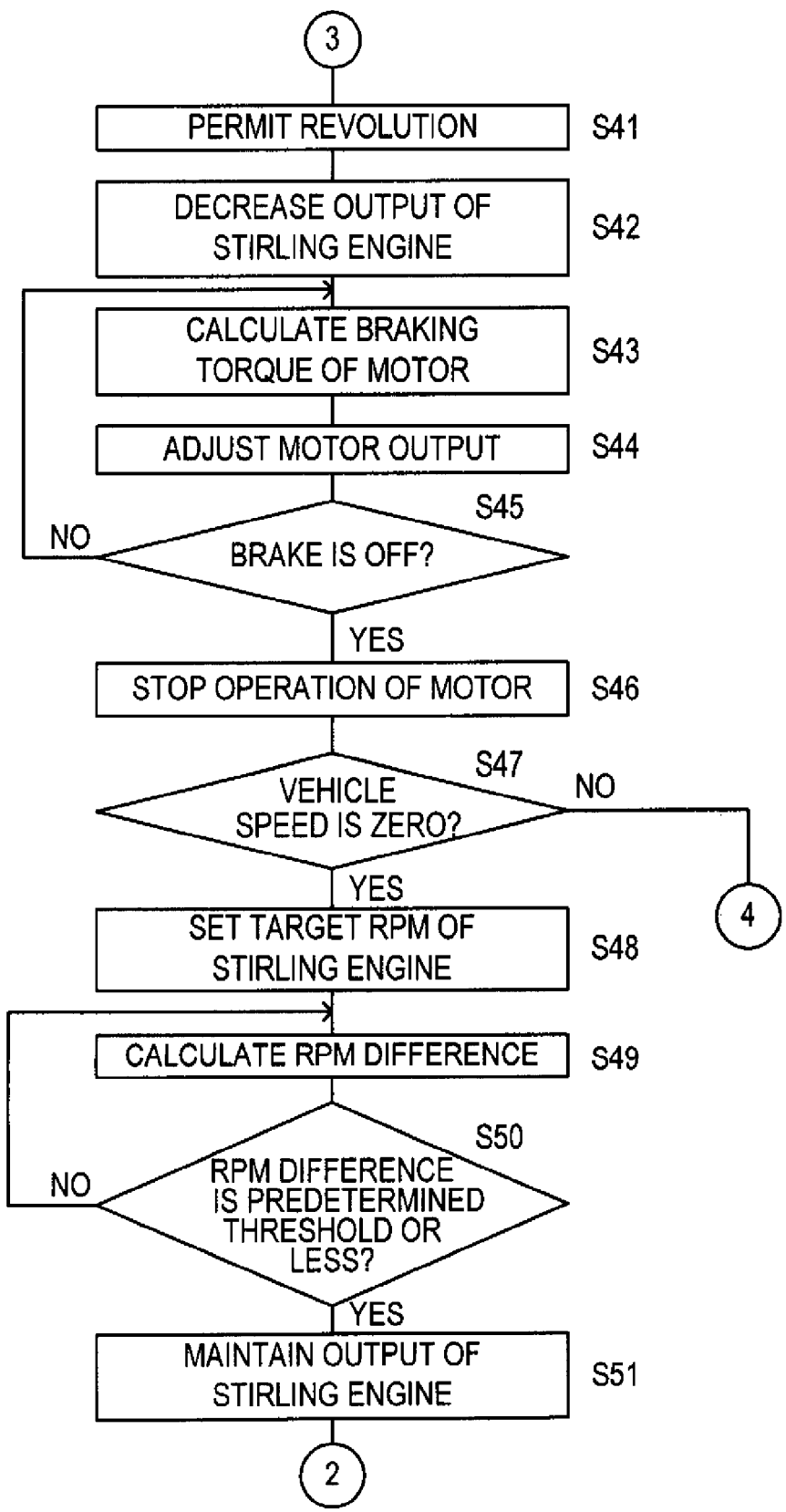
FIG. 12 is a flowchart showing the procedure of the vehicle driving process executed by the hybrid vehicle driving system according to the embodiment of the present disclosure.

When the brake 44 is ON (YES in S15), as shown in FIG. 12, the CPU 20 permits the revolution of the planetary gears 33, 33, . . . (S41). For this purpose, the CPU 20 in S41 controls the operation of the actuator 24 to separate the clutch plate 23 from the planetary carrier 34.

Then, the CPU 20 starts decreasing the output of the Stirling engine 12 (S42). A decreasing gradient of the output of the Stirling engine 12 may be always constant, and for example, the steepness of the decreasing gradient may be changed according to the depression amount of the brake 44.

Further, the CPU 20 calculates a braking torque value to be output by the motor 11 (S43). In S43, the CPU 20 calculates a depression amount of the brake pedal by the driver and/or changes with time in the depression amount based on the detection result input from the brake 44. The CPU 20 calculates the RPM of the ring gear 31 based on the detection result input from the gear sensor 141. Further, the CPU 20 calculates the braking torque value based on the calculation results so that the braking torque value is proportional to the RPM of the ring gear 31, and the RPM of the motor 11 by rotation in a driving manner is lower than the RPM transmitted from the ring gear 31 to the output shaft 111 via the worm gear 112.

To calculate the braking torque value so that the braking torque value is proportional to the RPM of the ring gear 31, it may be conceivable that a plurality of different proportional coefficients are previously stored in the ROM 21, and the CPU 20 gradually selects the proportional coefficients, for example, according to the RPM of the ring gear 31. The CPU 20 may consider the vehicle speed of the hybrid vehicle 4 instead of the RPM of the ring gear 31. Even with the same vehicle speed, a braking torque value of the hybrid vehicle 4 having a large mass is higher than a braking torque value of the hybrid vehicle 4 having a small mass.

Then, the CPU 20 controls the operation of the motor 11 to adjust the torque value output by the motor 11 to the braking torque value calculated in S43 (S44).

After the process in S44 is finished, the CPU 20 determines whether the brake 44 is OFF based on the detection result input from the brake 44 (S45). When the brake 44 is ON (NO in S45), the CPU 20 returns the process to S43.

The processes in S43 to S45 are repeated, and thus the hybrid vehicle 4 runs while decreasing the vehicle speed.

Now, the reason will be described that the motor 11 is operated to decrease the vehicle speed.

The process in S44 is executed, and thus the output shaft 111 of the motor 11 rotates in a driving manner. However, in S43, the braking torque value is calculated so that the RPM of the motor 11 by the rotation in a driving manner is lower than the RPM transmitted from the ring gear 31 to the output shaft 111 via the worm gear 112. Thus, the output shaft 111 of the motor 11 is driven by the rotation of the ring gear 31 and rotates at an RPM higher than the RPM of the rotation in a driving manner of the output shaft 111 of the motor 11 alone.

Thus, a counter electromotive force generated by the motor 11 is output to the outside of the motor 11 and supplied to the rechargeable battery 15. Specifically, between the finish of the process in S44 and execution of a process in S46 described later, the motor 11 operates as the generator.

Rotation resistance of the motor 11 during power generation acts as a braking force to decrease the RPM of the ring gear 31. Since the RPM of wheels 41 and 41 decreases with decreasing RPM of the ring gear 31, the vehicle speed decreases. In other words, the motor 11 during power generation functions as a motor brake.

The driver having turned on the brake 44 turns off the brake 44 when a desired speed is obtained.

When the brake 44 is OFF (YES in S45), the CPU 20 stops the operation of the motor 11 (S46).

Then, the CPU 20 determines whether the vehicle speed is zero based on the detection result of the vehicle speed sensor 42 (S47).

When the vehicle speed is zero (YES in S47), the driver wants to stop or halt the vehicle, and thus there is no need to drive the wheels 41 and 41 using the power output by the Stirling engine 12. However, if the operation of the Stirling engine 12 is stopped during the halt, it is necessary to restart the operation of the Stirling engine 12 in the restart, which is inefficient. Thus, the CPU 20 maintains operating the Stirling engine 12 in an idling state as long as the starting switch 40 is not turned off (that is, as long as it is not determined YES in S16).

Thus, the CPU 20 sets a predetermined RPM previously stored in the ROM 21 as a target RPM of the Stirling engine 12 (S48). The hybrid vehicle driving system 1 is not limited to a configuration with a constant predetermined RPM. For example, the predetermined RPM may be changeable according to some conditions (for example, according to whether the hybrid vehicle 4 runs on an open road or a freeway).

Then, the CPU 20 calculates the present RPM of the Stirling engine 12 based on the detection result of the engine sensor 142, and calculates an absolute value of a difference between the calculated RPM and the target RPM set in S48 (that is, an RPM difference) (S49).

Further, the CPU 20 determines whether the RPM difference calculated in S49 is the predetermined threshold previously stored in the ROM 21 or less (S50). The predetermined threshold used in S50 may be the same as or different from the predetermined threshold used in S34.

When the RPM difference calculated in S49 exceeds the predetermined threshold (NO in S50), that is, when the RPM of the Stirling engine 12 is still higher than the target RPM, the CPU 20 returns the process to S49.

While the processes in S49 and S50 are repeated, the output of the Stirling engine 12 continues decreasing. When the RPM of the Stirling engine 12 becomes too much lower than the target RPM and the RPM difference exceeds the predetermined threshold, it is sufficient that the CPU 20 increases the output of the Stirling engine 12 or executes processes in S51 and thereafter.

When the RPM difference calculated in S49 is the predetermined threshold or less (YES in S50), that is, when the RPM of the Stirling engine 12 reaches close to the target RPM, the CPU 20 maintains the output of the Stirling engine 12 at the present output (S51).

Since the revolution of the planetary gears 33, 33, ... remains permitted, the power output by the Stirling engine 12 is not transmitted to the ring gear 31. The operation of the motor 11 is stopped, and thus the power output by the motor 11 is not transmitted to the ring gear 31. Thus, the ring gear 31 does not rotate, and then the wheels 41 and 41 do not rotate.

After the process in S51 is finished, the CPU 20 returns the process to S13 shown in FIG. 10.

When the vehicle speed exceeds zero (NO in S47), between the execution of the process in S46 and execution of a process in S65 described later, the hybrid vehicle 4 runs at a constant speed desired by the driver by inertia. In this case, rotational movement of the ring gear 31 is transmitted to the output shaft 111 of the motor 11 via the worm gear 112 to rotate the output shaft 111 in a driven manner. In other words, the motor 11 runs idle.

During inertial running, for example, the vehicle speed gradually decreases by friction resistance between the wheels 41 and 41 and a road surface. Thus, to maintain a constant vehicle speed, the wheels 41 and 41 may be driven by the power output by the motor 11 between the determination as YES in S45 and execution of a process in S65. In this case, the CPU 20 needs to stop the operation of the motor 11 after the finish of a process in S64 described later and before the execution of the process in S65.

As shown in FIG. 13, the CPU 20 calculates a target RPM of the Stirling engine 12 (S61). In S61, the CPU 20 calculates a depression amount and a depression time of the brake pedal by the driver based on the detection result input from the brake 44, and calculates the target RPM based on the calculation result. In this embodiment, the RPM of the Stirling engine 12 is equal to the RPM of the ring gear 31, and thus the target RPM calculated in S61 is equal to the present RPM of the ring gear 31. The CPU 20 in S61 may calculate the target RPM of the Stirling engine 12 based on the present RPM of the ring gear 31 and a gear ratio between the ring gear 31 and the sun gear 32.

Further, the CPU 20 calculates the present RPM of the Stirling engine 12 based on the detection result of the engine sensor 142, and calculates an absolute value of a difference between the calculated RPM and the target RPM calculated in S61 (that is, an RPM difference) (S62).

Then, the CPU 20 determines whether the RPM difference calculated in S62 is a predetermined threshold previously stored in the ROM 21 or less (S63). The predetermined threshold used in S63 may be the same as or different from the predetermined thresholds used in S34 and S50.

When the RPM difference calculated in S62 exceeds the predetermined threshold (NO in S63), that is, when the RPM of the Stirling engine 12 is still higher than the target RPM, the CPU 20 returns the process to S62.

While the processes in S62 and S63 are repeated, the output of the Stirling engine 12 continues decreasing.

When the RPM of the Stirling engine 12 becomes too much lower than the target RPM and thus the RPM difference exceeds the predetermined threshold, it is sufficient that the CPU 20 increases the output of the Stirling engine 12.

When the RPM difference calculated in S62 is the predetermined threshold or less (YES in S63), that is, when the RPM of the Stirling engine 12 reaches close to the target RPM, the CPU 20 maintains the output of the Stirling engine 12 at the present output (S64).

Then, the CPU 20 inhibits the revolution of the planetary gears 33, 33, ... (S65). Thus, the CPU 20 in S65 controls the operation of the actuator 24 to connect the clutch plate 23 to the planetary carrier 34.

After the process in S65 is finished, the CPU 20 returns the process to S13 shown in FIG. 10.

Between the finish of the process in S65 and further execution of the process in S18 or S41, the hybrid vehicle 4 runs at a constant speed desired by the driver with the wheels 41 and 41 driven by the power output by the Stirling engine 12.

When the brake 44 is turned on again, for example, between the determination as YES in S45 and the execution of the process in S65, it is sufficient that the CPU 20 interrupts the process under execution and then performs the processes in S42 and thereafter. Also, when the accelerator 43 is turned on, for example, between the determination as YES in S45 and the execution of the process in S51 or S65, it is sufficient that the CPU 20 interrupts the process under execution and then performs the processes in S19 and thereafter.

The CPU 20 in S32 and S61 in the vehicle driving process as described above functions as an output calculation device. The CPU 20 in S33 and S62 functions as an output comparison device. Further, the CPU 20 in S34 and S63 functions as a power selection device.

Finally, an operation between when the stopping hybrid vehicle 4 starts running and when the hybrid vehicle 4 stops again will be described in detail with reference to flowcharts shown in FIGS. 10 to 13 using the characteristic views in FIGS. 3A to 3D, 4A to 4D, 5A to 5D, 6A to 6D and 7A to 7D and the schematic front views in FIGS. 8A to 8C and 9A to 9C.

When the stopping hybrid vehicle 4 starts and runs at a first vehicle speed (see FIGS. 3A to 3D), the RPM of the Stirling engine 12 increases from zero to a first target RPM corresponding to the first vehicle speed.

A supplied torque value and a supplied power value output by the Stirling engine 12 that outputs the first target RPM are hereinafter referred to as a first supplied torque value and a first supplied power value.

Between time $t_{10}$ and time $t_{11}$ shown in FIGS. 3A to 3D, the hybrid vehicle 4 stops.

The driver does not operate either the accelerator 43 or the brake 44, and turns on the starting switch 40.

At this time, the CPU 20 repeatedly executes the process in S11 shown in FIG. 10. When the CPU 20 determines YES in S11, the CPU 20 repeatedly executes the processes in S13, S14 and S16 after the finish of the process in S12.

Between the time $t_{10}$ and the time $t_{11}$ shown in FIGS. 3A to 3D, the worm gear 112, the reduction gear 251, and the planetary gear mechanism 3 stop rotation and revolution.

Figure 3A:
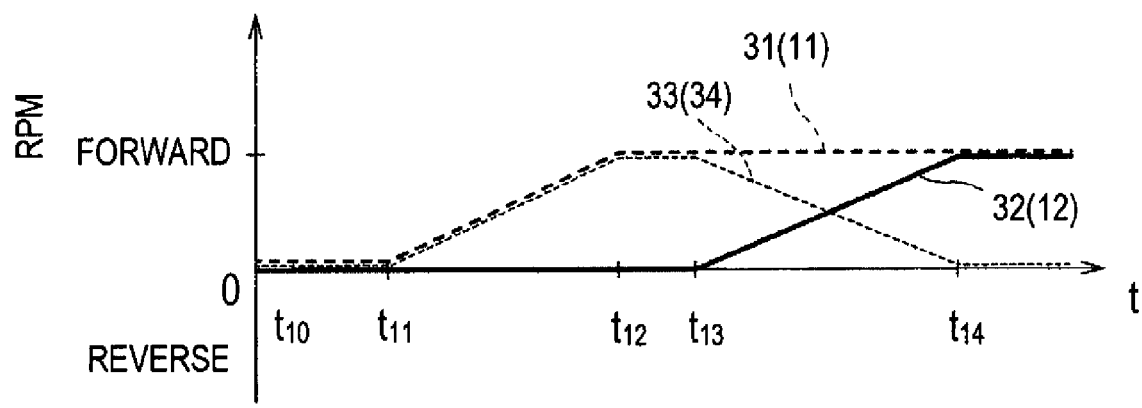
FIGS. 3A to 3D are characteristic views illustrating a case where the hybrid vehicle according to the embodiment of the present disclosure starts.
Figure 3B:
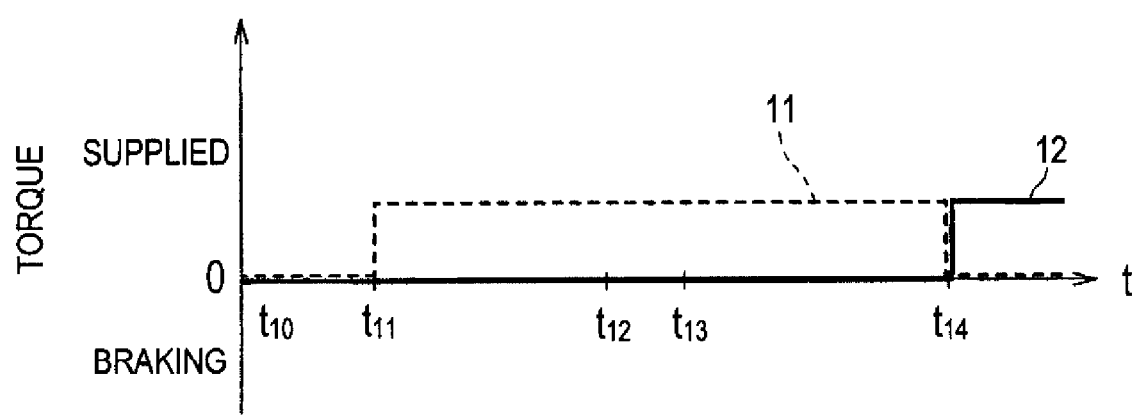
Figure 3C:
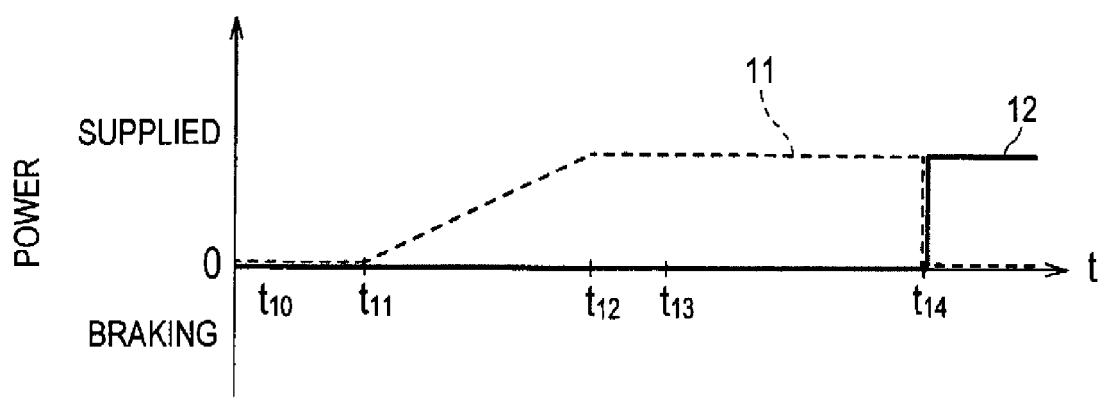

In this case, as shown in FIG. 3A, the RPMs of the ring gear 31, the sun gear 32, and the planetary gears 33, 33, . . . are constant at zero. As shown in FIG. 3B, the supplied torque values output by the motor 11 and the Stirling engine 12 are constant at zero. Further, as shown in FIG. 3C, the supplied power values output by the motor 11 and the Stirling engine 12 are constant at zero.

Figure 3D:
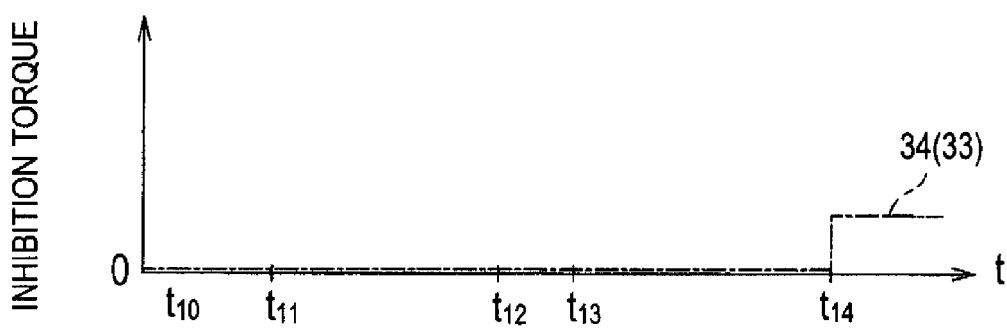

When the hybrid vehicle 4 is stopped, the clutch plate 23 is not connected to the planetary carrier 34. In other words, the revolution of the planetary gears 33, 33, . . . is permitted. Thus, as shown in FIG. 3D, an inhibition torque value is constant at zero.

At the time $t_{11}$ shown in FIGS. 3A to 3D, the driver turns on the accelerator 43, and the hybrid vehicle 4 starts increasing the vehicle speed.

At this time, the CPU 20 determines YES in S13 shown in FIG. 10, and executes the processes in S18 to S22.

Between the time $t_{11}$ and time $t_{12}$ shown in FIGS. 3A to 3D, the driver continues turning on the accelerator 43.

At this time, the CPU 20 repeatedly executes the processes in S20 to S22 shown in FIG. 10.

Between the time $t_{11}$ and the time $t_{12}$ shown in FIGS. 3A to 3D, as shown in FIG. 8A, the power output by the motor 11 causes the worm gear 112 to rotate rightward in a driving manner while increasing the RPM. With the rotation of the worm gear 112, the ring gear 31 of the planetary gear mechanism 3 rotates leftward in a driven manner. Further, with the rotation of the ring gear 31, the reduction gear 251 rotates rightward in a driven manner. Further, with the rotation of the ring gear 31, the planetary gears 33, 33, . . . rotate leftward and revolve leftward.

However, the sun gear 32 does not rotate. It is because the Stirling engine 12 has not yet output sufficient power for rotating the sun gear 32 in a driving manner. It is also further because the revolution of the planetary gears 33, 33, . . . is permitted, and rotation in a driving manner of the worm gear 112 is not transmitted to the sun gear 32 via the ring gear 31 and the planetary gears 33, 33, . . . .

Between the time $t_{11}$ and the time $t_{12}$ shown in FIGS. 3A to 3D, if the supplied torque value output by the motor 11 is constant at a positive number as shown in FIG. 3B, the RPM of the ring gear 31 linearly increases as shown in FIG. 3A. As shown in FIG. 3C, the supplied power value output by the motor 11 linearly increases in proportional to the linear increase in the RPM of the ring gear 31. It is because the supplied power value output by the motor 11 is equal to a multiplication result obtained by multiplying the RPM of the motor 11 (and thus the RPM of the ring gear 31) by the supplied torque value output by the motor 11.

As shown in FIG. 3A, the RPM of the planetary gears 33, 33, . . . linearly increases in proportional to the linear increase in the RPM of the ring gear 31.

Meanwhile, as shown in FIG. 3B, the supplied torque value output by the Stirling engine 12 is constant at zero. Thus, as shown in FIG. 3A, the RPM of the sun gear 32 is constant at zero. As shown in FIG. 3C, the supplied power value output by the Stirling engine 12 is constant at zero.

Since the revolution of the planetary gears 33, 33, . . . is permitted, as shown in FIG. 3D, the inhibition torque value is constant at zero.

At the time $t_{12}$ shown in FIGS. 3A to 3D, the driver turns off the accelerator 43, and the hybrid vehicle 4 runs at a constant speed desired by the driver. After the time $t_{12}$, the driver maintains the accelerator 43 off and does not operate the brake 44.

At this time, the CPU 20 determines YES in S22 shown in FIG. 10, and executes the processes in S31 to S34 shown in FIG. 11. Further, the CPU 20 repeatedly executes the processes in S33 and S34 shown in FIG. 11 between the time $t_{12}$ and time $t_{14}$ shown in FIGS. 3A to 3D.

Between the time $t_{12}$ and time $t_{13}$ shown in FIGS. 3A to 3D, as shown in FIGS. 3A and 8A, the power output by the motor 11 causes the worm gear 112 to rotate rightward in a driving manner at the first target RPM. With the rotation of the worm gear 112, the ring gear 31 rotates leftward in a driven manner. Further, with the rotation of the ring gear 31, the reduction gear 251 rotates rightward in a driven manner. Further, with the rotation of the ring gear 31, the planetary gears 33, 33, . . . rotate leftward and revolve leftward.

However, sun gear 32 has not yet rotated. Thus, as shown in FIG. 3A, the RPM of the sun gear 32 is constant at zero.

At the time $t_{13}$ shown in FIGS. 3A to 3D, the Stirling engine 12 starts outputting sufficient power for rotating the sun gear 32 in a driving manner.

Thus, between the time $t_{13}$ to time $t_{14}$, as shown in FIG. 3A, the RPM of the sun gear 32 increases.

Between the time $t_{13}$ and the time $t_{14}$, as shown in FIGS. 3A and 8B, the power output by the motor 11 causes the worm gear 112 to rotate rightward in a driving manner at the first target RPM, and with the rotation of the worm gear 112, the ring gear 31 rotates leftward in a driven manner. Further, with the rotation of the ring gear 31, the reduction gear 251 rotates rightward in a driven manner.

With the rotation of the ring gear 31, the planetary gears 33, 33, . . . rotate leftward and revolve leftward, but the power output by the Stirling engine 12 causes the sun gear 32 to rotate rightward in a driving manner while increasing the RPM, and thus the RPM of the planetary gears 33, 33, . . . decreases in proportion to the increase in the RPM of the sun gear 32. Since the RPM of the ring gear 31 is higher the RPM of the sun gear 32, the RPM of the planetary gears 33, 33, . . . does not decrease to a negative number (that is, the planetary gears 33, 33, . . . do not revolve rightward).

Between the time $t_{12}$ to the time $t_{14}$ shown in FIGS. 3A to 3D, as shown in FIG. 3B, the supplied torque value output by the motor 11 is constant at a first supplied torque value. As shown in FIG. 3C, the supplied power value output by the motor 11 is constant at the first supplied power value.

Since the revolution of the planetary gears 33, 33, . . . is permitted, as shown in FIG. 3D, the inhibition torque value is constant at zero. Thus, as shown in FIG. 3D, the supplied torque value output by the Stirling engine 12 is constant at zero. As shown in FIG. 3C, the supplied power value output by the Stirling engine 12 is constant at zero.

At the time $t_{14}$ shown in FIGS. 3A to 3D, the CPU 20 determines YES in S34 shown in FIG. 11. Further, the CPU 20 executes the processes in S35 to S37 shown in FIG. 11 after the time $t_{14}$ shown in FIGS. 3A to 3D, and then repeatedly executes the processes in S13 to S15.

The time $t_{14}$ is a time when the value of the power output by the motor 11 becomes proportional to the value of the power output by the Stirling engine 12. Thus, as shown in FIG. 3A, the RPM of the ring gear 31 becomes equal to the RPM of the sun gear 32, and the RPM of the planetary gears 33, 33, . . . becomes zero. At this time, the RPM of the sun gear 32 is equal to the first target RPM.

At the time $t_{14}$, the operation of the motor 11 is stopped to inhibit the revolution of the planetary gears 33, 33, . . . . Thus, after the time $t_{14}$, as shown in FIGS. 3B and 3C, the supplied torque value and the supplied power value output by the motor 11 are constant at zero. As shown in FIG. 3D, the inhibition torque value applied to the planetary carrier 34 is constant at a positive number according to the RPM of the sun gear 32. The inhibition torque value at the time $t_{14}$ is herein referred to as a first inhibition torque value.

After the time $t_{14}$, as shown in FIGS. 3A and 8C, the power output by the Stirling engine 12 causes the sun gear 32 to rotate rightward in a driving manner at the first target RPM, and with the rotation of the sun gear 32, the planetary gears 33, 33, . . . rotate leftward. At this time, the planetary gears 33, 33, . . . do not revolve (that is, the RPM is constant at zero). With the rotation of the planetary gears 33, 33, . . . , the ring gear 31 rotates leftward in a driven manner. Further, with the rotation of the ring gear 31, the worm gear 112 and the reduction gear 251 rotate rightward in a driven manner. The RPM of the worm gear 112 is equal to the first target RPM.

In this case, after the time $t_{14}$, as shown in FIG. 3B, the supplied torque value output by the Stirling engine 12 is constant at the first supplied torque value, and as shown in FIG. 3C, the supplied power value output by the Stirling engine 12 is constant at the first supplied power value. It is because the supplied power value output by the Stirling engine 12 is equal to a multiplication result obtained by multiplying the RPM of the Stirling engine 12 (and thus the RPM of the ring gear 31) by the supplied torque value output by the Stirling engine 12.

When the hybrid vehicle 4 running at the first vehicle speed accelerates and runs at a second vehicle speed higher than the first vehicle speed (see FIGS. 4A to 4D), the RPM of the Stirling engine 12 increases from the first target RPM to a second target RPM corresponding to the second vehicle speed.

A supplied torque value and a supplied power value output by the Stirling engine 12 that outputs the second target RPM are herein referred to as a second supplied torque value and a second supplied power value. The second supplied torque value and the second supplied power value are larger than the first supplied torque value and the first supplied power value.

Between time $t_{20}$ and time $t_{21}$ shown in FIGS. 4A to 4D, the hybrid vehicle 4 runs at the first vehicle speed similarly to after the time $t_{14}$ shown in FIGS. 3A to 3D.

At this time, the CPU 20 repeatedly executes the processes in S13 to S15 shown in FIG. 10.

At the time $t_{21}$ shown in FIGS. 4A to 4D, the driver turns on the accelerator 43, and the hybrid vehicle 4 starts increasing the vehicle speed.

At this time, the CPU 20 determines YES in S13 shown in FIG. 10 and executes the processes in S18 to S22.

Between the time $t_{21}$ and time $t_{23}$ shown in FIGS. 4A to 4D, the driver continues turning on the accelerator 43.

At this time, the CPU 20 repeatedly executes the processes in S20 to S22 shown in FIG. 10.

At the time $t_{23}$ shown in FIGS. 4A to 4D, the driver turns off the accelerator 43, and after the time $t_{23}$, the driver maintains the accelerator 43 off and does not operate the brake 44.

At this time, the CPU 20 determines YES in S22 shown in FIG. 10, and performs the processes in S31 to S34 shown in FIG. 11. Also, at the time $t_{24}$, the CPU 20 determines YES in S34 and executes the processes in S35 and thereafter.

Figure 4A:
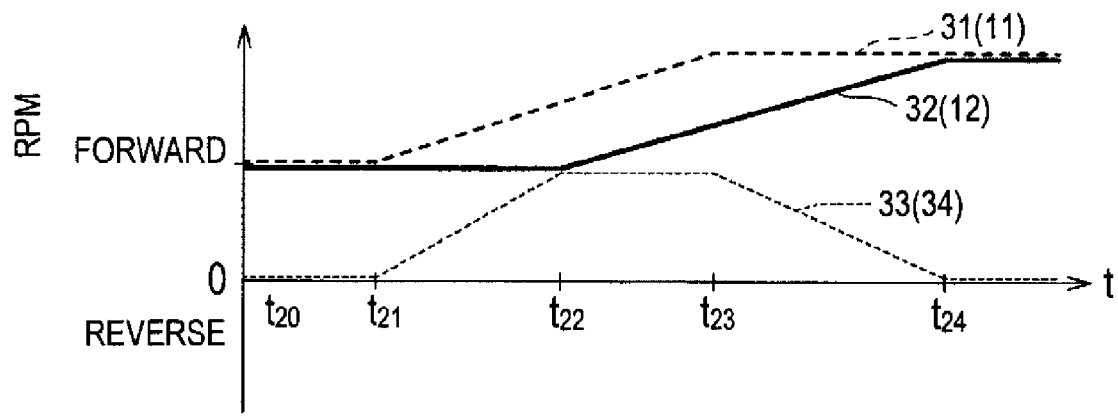
FIGS. 4A to 4D are characteristic views illustrating a case where the hybrid vehicle according to the embodiment of the present disclosure accelerates.
Figure 4B:
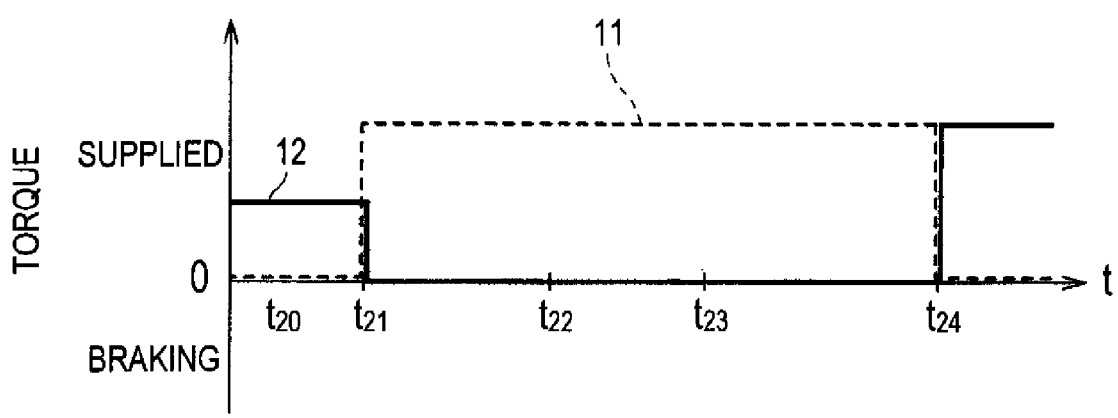
Figure 4C:
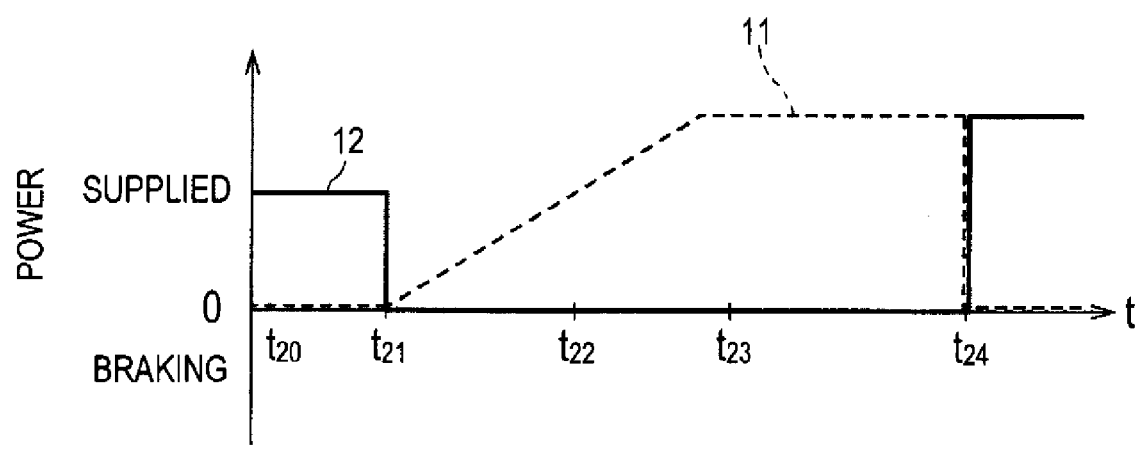
Figure 4D:
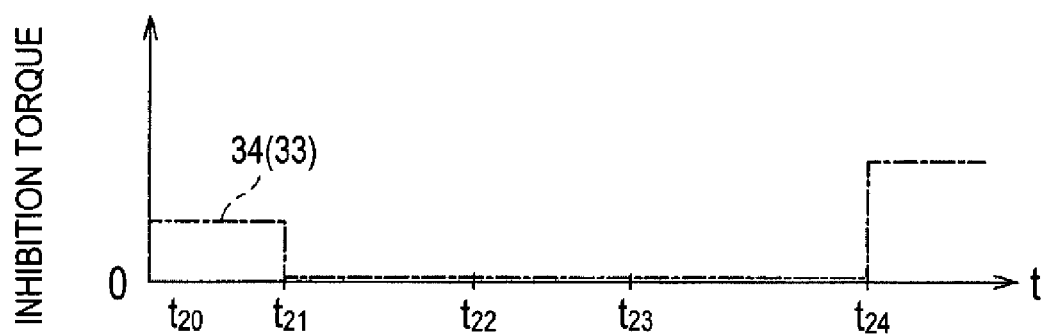

Between the time $t_{21}$ and the time $t_{24}$, the revolution of the planetary gears 33, 33, . . . is permitted, and thus as shown in FIG. 4D, the inhibition torque value is constant at zero. After the time $t_{24}$, the revolution of the planetary gears 33, 33, . . . is inhibited, and thus the inhibition torque value is constant at a second inhibition torque value larger than the first inhibition torque value.

Thus, as shown in FIGS. 4B and 4C, between the time $t_{21}$ and the time $t_{24}$, the supplied torque value and the supplied power value output by the Stirling engine 12 are each constant at zero, and after the time $t_{24}$, the supplied torque value and the supplied power value output by the Stirling engine 12 are constant at the second supplied torque value and the second supplied power value.

The inhibition torque value is proportional to a force to revolve the planetary gears 33, 33, . . . . The force of the sun gear 32 that rotates at the second target RPM to revolve the planetary gears 33, 33, . . . is larger than a force of the sun gear 32 that rotates at the first target RPM to revolve the planetary gears 33, 33, . . . . Thus, the second inhibition torque value is larger than the first inhibition torque value.

As shown in FIG. 4B, between the time $t_{21}$ and the time $t_{24}$, the motor 11 continues outputting the second supplied torque value. After the time $t_{24}$, the operation of the motor 11 is stopped. Thus, the supplied torque value output by the motor 11 is constant at zero.

Thus, as shown in FIGS. 4A and 8B, between the time $t_{21}$ and the time $t_{23}$, the power output by the motor 11 causes the worm gear 112 to rotate rightward in a driving manner while increasing the RPM, and between the time $t_{23}$ and the time $t_{24}$, the power output by the motor 11 causes the worm gear 112 to rotate rightward in a driving manner at the second target RPM. After the time $t_{24}$, as shown in FIGS. 4A and 8C, the worm gear 112 rotates rightward in a driven manner with the rotation of the ring gear 31.

As shown in FIG. 4C, between the time $t_{21}$ and the time $t_{24}$, changes with time in the supplied power value output by the motor 11 correspond to changes with time in the RPM of the motor 11 shown in FIG. 4A. After the time $t_{24}$, the supplied power value output by the motor 11 is constant at zero.

As shown in FIG. 4A, between the time $t_{21}$ and the time $t_{22}$, the power output by the Stirling engine 12 causes the sun gear 32 to continue rotating at the first target RPM, between the time $t_{22}$ and the time $t_{24}$, the RPM increases, and after the time $t_{24}$, the RPM becomes constant at the second target RPM.

From the above, as shown in FIGS. 4A and 8B, between the time $t_{21}$ and the time $t_{22}$, with the rotation in a driving manner of the worm gear 112 with the increasing RPM, the ring gear 31 rotates leftward in a driven manner. Further, with the rotation of the ring gear 31, the reduction gear 251 rotates rightward in a driven manner. With the rotation of the ring gear 31, the planetary gears 33, 33, . . . rotate leftward and revolve leftward. At this time, the RPM of the sun gear 32 is constant, and thus the RPM of the planetary gears 33, 33, . . . increases with the increasing RPM of the ring gear 31.

Between the time $t_{22}$ and the time $t_{23}$, with the rotation in a driving manner of the worm gear 112 with the increasing RPM, the ring gear 31 rotates leftward in a driven manner. Further, with the rotation of the ring gear 31, the reduction gear 251 rotates rightward in a driven manner. With the rotation of the ring gear 31, the planetary gears 33, 33, . . . rotate leftward and revolve leftward. At this time, the RPM of the sun gear 32 increases to cancel out the increasing part of the RPM of the ring gear 31, and thus the RPM of the planetary gears 33, 33, . . . is constant.

Further, between the time $t_{23}$ and the time $t_{24}$, with the rotation in a driving manner of the worm gear 112 with the constant RPM, the ring gear 31 rotates leftward in a driven manner. Further, with the rotation of the ring gear 31, the reduction gear 251 rotates rightward in a driven manner. With the rotation of the ring gear 31, the planetary gears 33, 33, . . . rotate leftward and revolve leftward. At this time, the RPM of the worm gear 112 is constant, and thus the RPM of the planetary gears 33, 33, . . . decreases with increasing RPM of the sun gear 32. At the time $t_{24}$, the RPM of the planetary gears 33, 33, . . . becomes zero.

Further, as shown in FIGS. 4A and 8C, after the time $t_{24}$, with the rotation in a driving manner of the sun gear 32, the planetary gears 33, 33, . . . rotate leftward. At this time, the planetary gears 33, 33, . . . do not revolve (that is, the RPM is constant at zero). With the rotation of the planetary gears 33, 33, . . . , the ring gear 31 rotates leftward in a driven manner. Further, with the rotation of the ring gear 31, the worm gear 112 and the reduction gear 251 each rotate rightward in a driven manner.

The hybrid vehicle 4 running at the second vehicle speed decelerates and runs at the first vehicle speed (see FIGS. 5A to 5D), the RPM of the Stirling engine 12 decreases from the second target RPM to the first target RPM.

Between time $t_{30}$ and time $t_{31}$ shown in FIGS. 5A to 5D, the hybrid vehicle 4 runs at the second vehicle speed similarly to after the time $t_{24}$ shown in FIGS. 4A to 4D.

At this time, the CPU 20 repeatedly executes the processes in S13 to S15 shown in FIG. 10.

At the time $t_{31}$ shown in FIGS. 5A to 5D, the driver turns on the brake 44, and the hybrid vehicle 4 starts decreasing the vehicle speed.

At this time, the CPU 20 determines YES in S15 shown in FIG. 10, and executes processes in S41 to S45 shown in FIG. 12.

Between the time $t_{31}$ and the time $t_{33}$ shown in FIGS. 5A to 5D, the driver continues turning on the brake 44.

At this time, the CPU 20 repeatedly executes the processes in S43 to S45 shown in FIG. 12.

At the time $t_{33}$ shown in FIGS. 5A to 5D, the driver turns off the brake 44, and after the time $t_{33}$, the driver does not operate either the accelerator 43 or the brake 44.

In this case, the hybrid vehicle 4 runs at the first vehicle speed.

At this time, the CPU 20 executes processes in S46 and S47 shown in FIG. 12, and then executes the processes in S61 to S63 shown in FIG. 12. Further, the CPU 20 determines YES in S63 at the time $t_{34}$, and executes processes in S64 and thereafter, and then repeatedly executes the processes in S13 to S15 shown in FIG. 10.

Figure 5A:
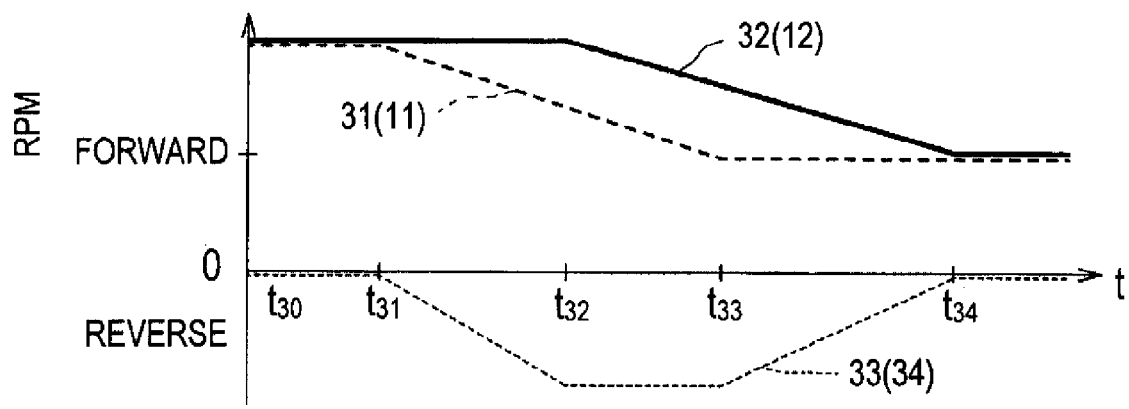
FIGS. 5A to 5D are characteristic views illustrating a case where the hybrid vehicle according to the embodiment of the present disclosure decelerates.
Figure 5B:
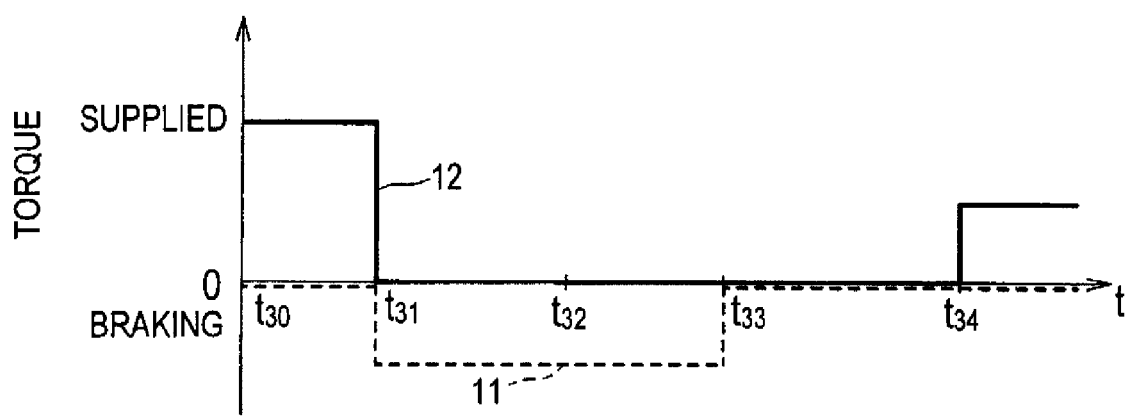
Figure 5C:
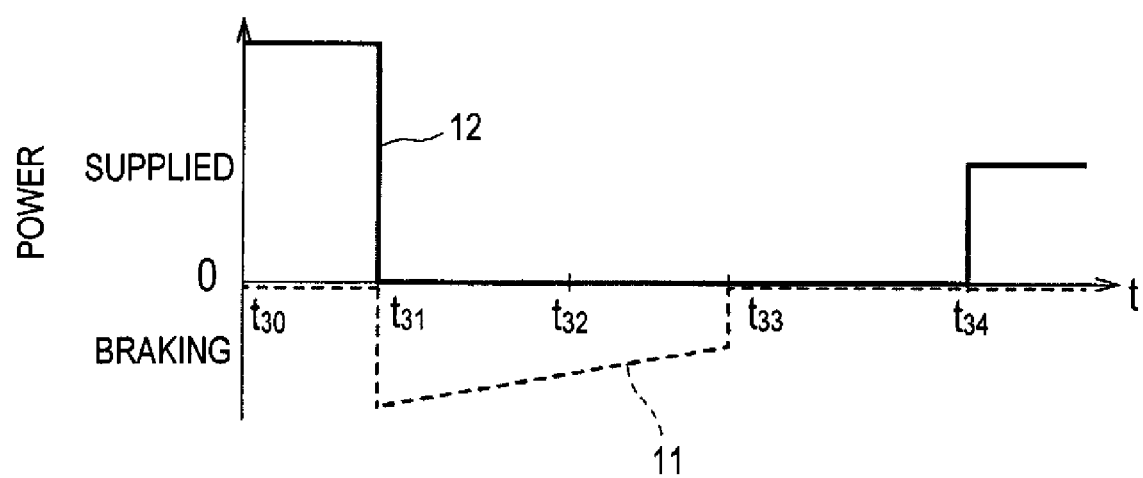
Figure 5D:
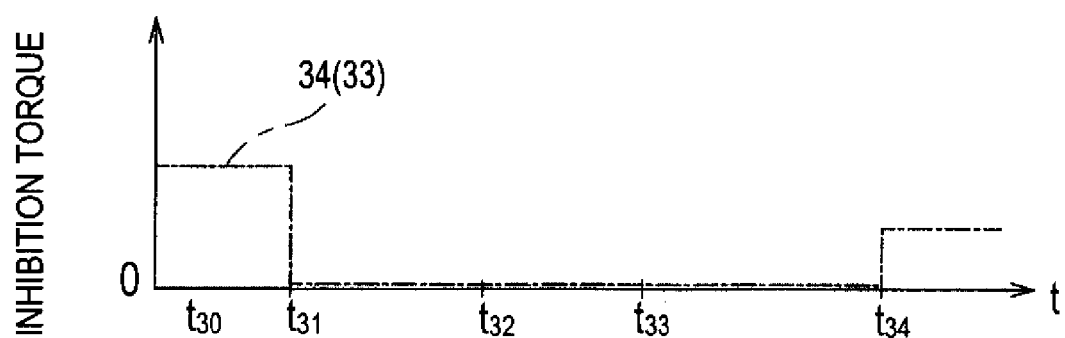

Between the time $t_{31}$ and the time $t_{34}$, the revolution of the planetary gears 33, 33, . . . is permitted, and thus as shown in FIG. 5D, the inhibition torque value is constant at zero. After the time $t_{34}$, the revolution of the planetary gears 33, 33, . . . is inhibited, and thus the inhibition torque value is constant at the first inhibition torque value.

Thus, as shown in FIGS. 5B and 5C, between the time $t_{31}$ and the time $t_{34}$, the supplied torque value and the supplied power value output by the Stirling engine 12 are each constant at zero, and after the time $t_{34}$, the supplied torque value and the supplied power value output by the Stirling engine 12 are constant at the first supplied torque value and the first supplied power value.

As shown in FIG. 5B, between the time $t_{31}$ and the time $t_{33}$, the motor 11 continues outputting a negative supplied torque value, that is, the braking torque value. While the brake 44 is ON, the motor 11 functions as a motor brake. After the time $t_{33}$, the operation of the motor 11 is stopped, and thus the braking torque value is constant at zero.

Thus, as shown in FIGS. 5A and 9A, between the time $t_{31}$ and the time $t_{33}$, the worm gear 112 decreases the RPM and rotates rightward in a driving manner, and as shown in FIGS. 5A and 9B, after the time $t_{33}$, the worm gear 112 rotates rightward in a driven manner at the second target RPM.

As shown in FIG. 5C, between the time $t_{31}$ and the time $t_{33}$, changes with time in the braking power value output by the motor 11 corresponds to changes in the RPM of the motor 11 shown in FIG. 5A. After the time $t_{33}$, the braking power value output by the motor 11 is constant at zero.

As shown in FIG. 5A, between the time $t_{31}$ and the time $t_{32}$, the power output by the Stirling engine 12 causes the sun gear 32 to continue rotating at the second target RPM, between the time $t_{32}$ and the time $t_{34}$, the RPM decreases, and after the time $t_{34}$, the RPM becomes constant at the first target RPM.

From the above, as shown in FIGS. 5A and 9A, between the time $t_{31}$ and the time $t_{32}$, braking by the rotation in a driving manner of the worm gear 112 causes the ring gear 31 to rotate leftward while decreasing the RPM. With the rotation of the ring gear 31, the reduction gear 251 rotates rightward in a driven manner.

With decreasing RPM of the ring gear 31, the RPM of the ring gear 31 becomes lower than the RPM of the sun gear 32. The RPM of the sun gear 32 is constant. Thus, the planetary gears 33, 33, . . . rotate leftward, and revolve rightward while increasing a negative RPM.

As shown in FIGS. 5A and 9A, between the time $t_{32}$ and the time $t_{33}$, braking by the rotation in a driving manner of the worm gear 112 causes the ring gear 31 to rotate leftward while decreasing the RPM. With the rotation of the ring gear 31, the reduction gear 251 rotates rightward in a driven manner.

At this time, the RPMs of the ring gear 31 and the sun gear 32 decrease. Thus, the planetary gears 33, 33, . . . rotate leftward and revolve rightward at a constant RPM.

As shown in FIGS. 5A and 9B, between the time $t_{33}$ and the time $t_{34}$, the motor 11 runs idle, and the ring gear 31 rotates leftward at the first target RPM by inertia. With the rotation of the ring gear 31, the reduction gear 251 rotates rightward in a driven manner.

The RPM of the sun gear 32 further decreases, and a difference from the RPM of the ring gear 31 decreases. Thus, the planetary gears 33, 33, . . . rotate leftward, and revolve rightward while decreasing the negative RPM. At the time $t_{34}$, the RPM of the planetary gears 33, 33, . . . becomes zero.

Further, as shown in FIGS. 5A and 8C, after the time $t_{34}$, with the rotation in a driving manner of the sun gear 32 at the first target RPM, the planetary gears 33, 33, . . . rotate leftward. At this time, the planetary gears 33, 33, . . . do not revolve (that is, the RPM is constant at zero). With the rotation of the planetary gears 33, 33, . . . , the ring gear 31 rotates leftward in a driven manner. Further, with the rotation of the ring gear 31, the worm gear 112 and the reduction gear 251 each rotate rightward in a driven manner.

When the hybrid vehicle 4 running at the first vehicle speed stops (see FIGS. 6A to 6D), the RPM of the Stirling engine 12 decreases from the first target RPM to zero.

Between the time $t_{40}$ and the time $t_{41}$ shown in FIGS. 6A to 6D, the hybrid vehicle 4 runs at the first vehicle speed similarly to after the time $t_{34}$ shown in FIGS. 5A to 5D.

At this time, the CPU 20 repeatedly executes the processes in S13 to S15 shown in FIG. 10.

At the time $t_{41}$ shown in FIGS. 6A to 6D, the driver turns on the brake 44, the hybrid vehicle 4 starts decreasing the vehicle speed.

At this time, the CPU 20 determines YES in S15 shown in FIG. 10, and executes the processes in S41 to S45 shown in FIG. 12.

Between the time $t_{41}$ and the time $t_{43}$ shown in FIGS. 6A to 6D, the driver continues turning on the brake 44.

At this time, the CPU 20 repeatedly executes the processes in S43 to S45 shown in FIG. 12.

At the time $t_{43}$ shown in FIGS. 6A to 6D, the driver turns off the brake 44, after the time $t_{43}$, the driver does not operate either the accelerator 43 or the brake 44, and turns off the starting switch 40.

In this case, the vehicle speed of the hybrid vehicle 4 is zero.

At this time, the CPU 20 executes the processes in S46 to S51 shown in FIG. 12, and then executes the processes in S13, S14 and S16 shown in FIG. 10. When the CPU 20 determines YES in S16, the CPU 20 repeatedly executes the process in S11 after the finish of the process in S17.

Figure 6A:
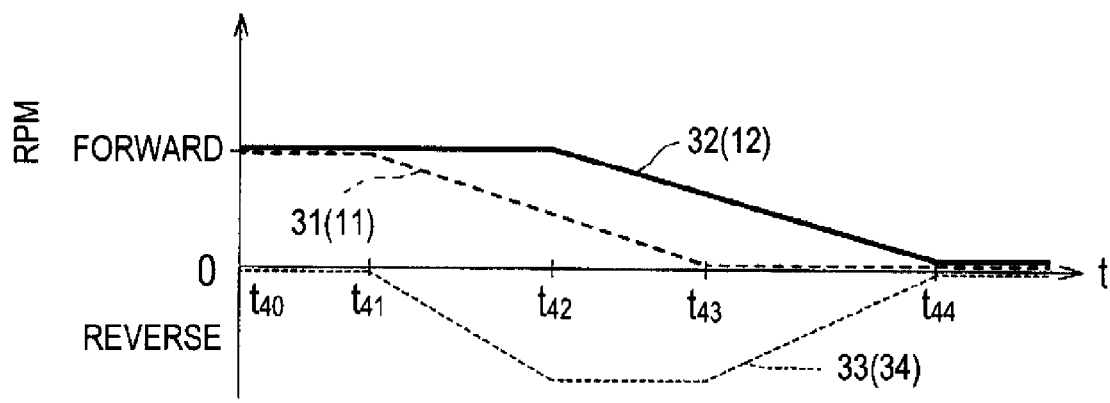
FIGS. 6A to 6D are characteristic views illustrating a case where the hybrid vehicle according to the embodiment of the present disclosure stops.
Figure 6B:
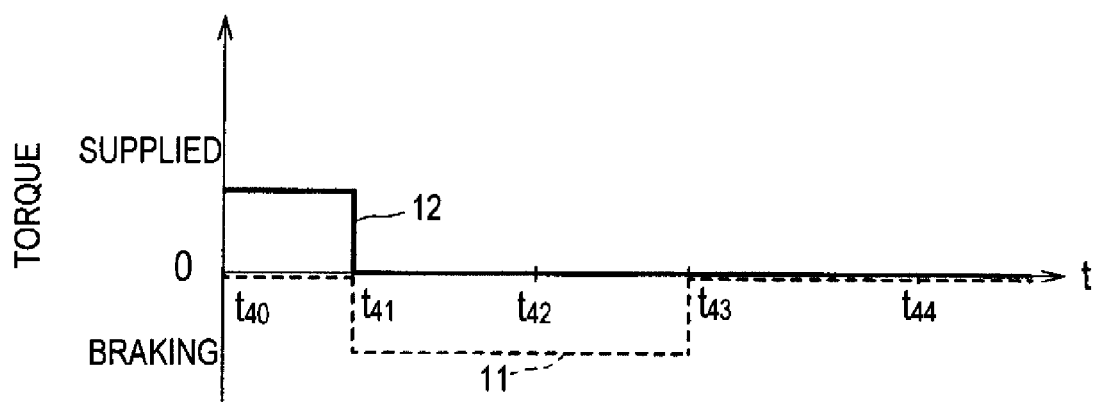
Figure 6C:
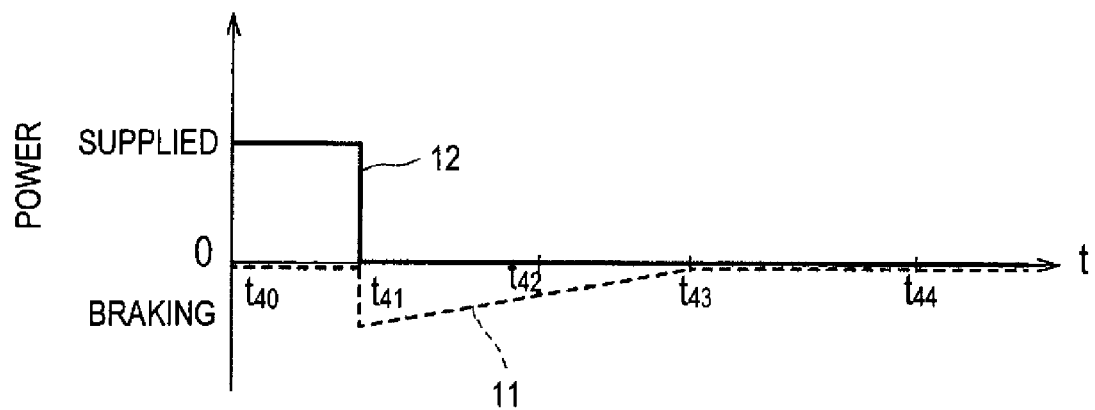
Figure 6D:
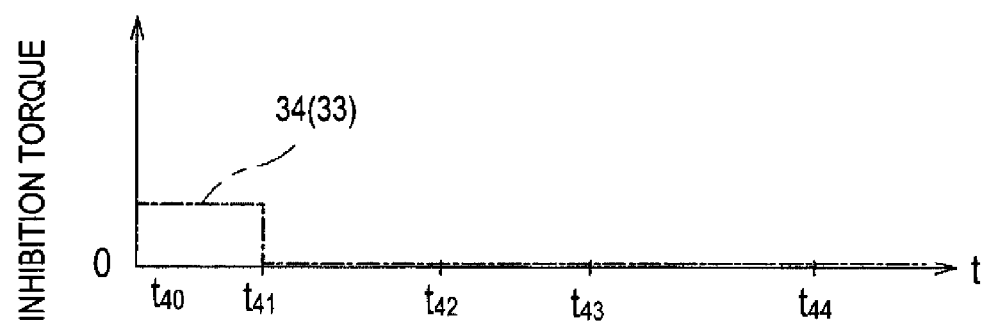

After the time $t_{41}$, the revolution of the planetary gears 33, 33, . . . is permitted, and thus as shown in FIG. 6D, the inhibition torque value is constant at zero.

Thus, as shown in FIGS. 6B and 6C, after the time $t_{41}$, the supplied torque value and the supplied power value output by the Stirling engine 12 are each constant at zero.

As shown in FIG. 6B, between the time $t_{41}$ and the time $t_{43}$, the motor 11 continues outputting a negative supplied torque value, that is, the braking torque value. Specifically, while the brake 44 is ON, the motor 11 functions as a motor brake. After the time $t_{43}$, the operation of the motor 11 is stopped, and thus the braking torque value is constant at zero.

Thus, as shown in FIGS. 6A and 9A, between the time $t_{41}$ and the time $t_{43}$, the worm gear 112 rotates rightward in a driving manner while decreasing the RPM, and as shown in FIGS. 6A and 9C, after the time $t_{43}$, the RPM of the worm gear 112 is constant at zero.

As shown in FIG. 6C, between the time $t_{41}$ and the time $t_{43}$, changes with time in the supplied power value output by the motor 11 corresponds to changes in the RPM of the motor 11 shown in FIG. 6A. After the time $t_{43}$, the supplied power value output by the motor 11 is constant at zero.

As shown in FIG. 6A, between the time $t_{41}$ and the time $t_{42}$, the power output by the Stirling engine 12 causes the sun gear 32 to continue rotating at the first target RPM, between the time $t_{42}$ and the time $t_{44}$, the RPM decreases, and after the time $t_{44}$, the RPM becomes constant at zero.

From the above, as shown in FIGS. 6A and 9A, between the time $t_{41}$ and the time $t_{42}$, braking by the rotation in a driving manner of the worm gear 112 causes the ring gear 31 to rotate leftward while decreasing the RPM. With the rotation of the ring gear 31, the reduction gear 251 rotates rightward in a driven manner.

With decreasing RPM of the ring gear 31, the RPM of the ring gear 31 becomes lower than the RPM of the sun gear 32. The RPM of the sun gear 32 is constant. Thus, the planetary gears 33, 33, . . . rotate leftward, and revolve rightward while increasing the negative RPM.

As shown in FIGS. 6A and 9A, between the time $t_{42}$ and the time $t_{43}$, braking by the rotation in a driving manner of the worm gear 112 causes the ring gear 31 to rotate leftward while decreasing the RPM. With the rotation of the ring gear 31, the reduction gear 251 rotates rightward in a driven manner.

At this time, the RPMs of the ring gear 31 and the sun gear 32 decrease. Thus, the planetary gears 33, 33, . . . rotate leftward and revolve rightward at a constant RPM.

As shown in FIGS. 6A and 9C, between the time $t_{43}$ and the time $t_{44}$, the operation of the motor 11 is stopped, and with rotation stop of the worm gear 112, the ring gear 31 stops rotation. With the rotation stop of the ring gear 31, the reduction gear 251 stops rotation.

The RPM of the sun gear 32 further decreases, and a difference from the RPM of the ring gear 31 decreases. Thus, the planetary gears 33, 33, . . . rotate leftward, and revolve rightward while decreasing the negative RPM. At the time $t_{44}$, the RPM of the planetary gears 33, 33, . . . becomes zero.

Further, as shown in FIG. 6A, after the time $t_{44}$, the RPM of the sun gear 32 becomes constant at zero. With the rotation stop of the sun gear 32, the planetary gears 33, 33, . . . stop rotation and revolution. Of course, the ring gear 31, the worm gear 112, and the reduction gear 251 each also stop rotation.

The case where the hybrid vehicle 4 running at the first vehicle speed halts and then restarts and runs at the first vehicle speed (see FIGS. 7A to 7D) is similar to the case where the hybrid vehicle 4 running at the first vehicle speed stops (see FIGS. 6A to 6D) and then restarts and runs at the first vehicle speed (see FIGS. 3A to 3D).

Figure 7A:
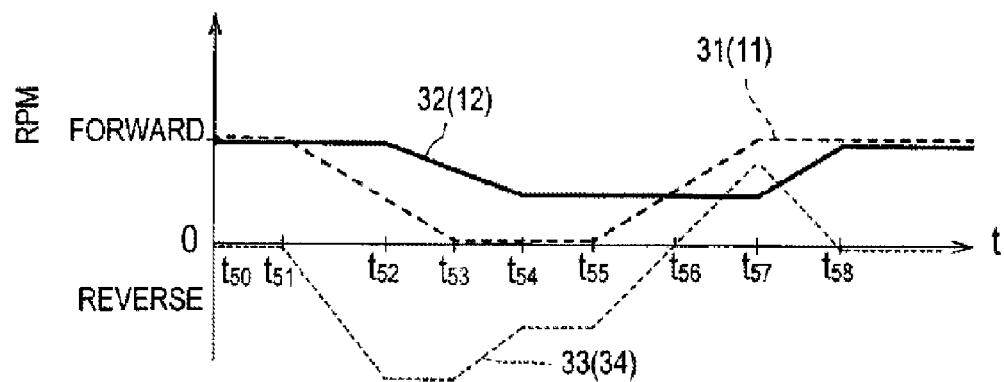
FIGS. 7A to 7D are characteristic views illustrating a case where the hybrid vehicle according to the embodiment of the present disclosure halts and then restarts.
Figure 7B:
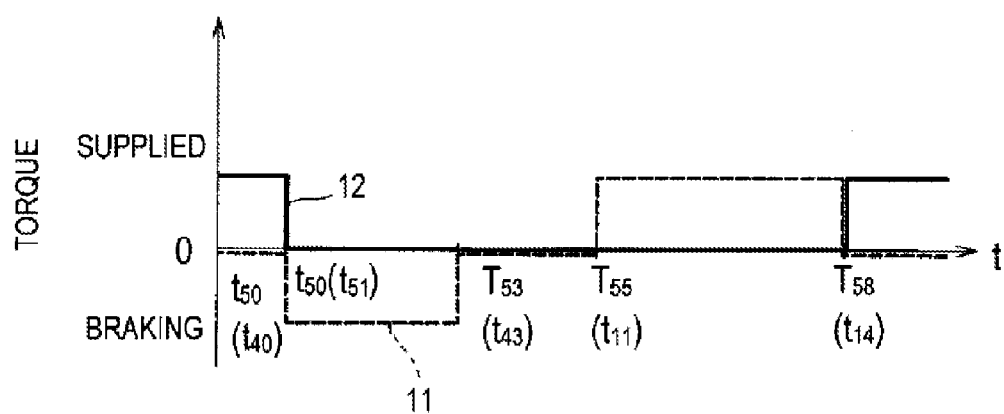
Figure 7C:
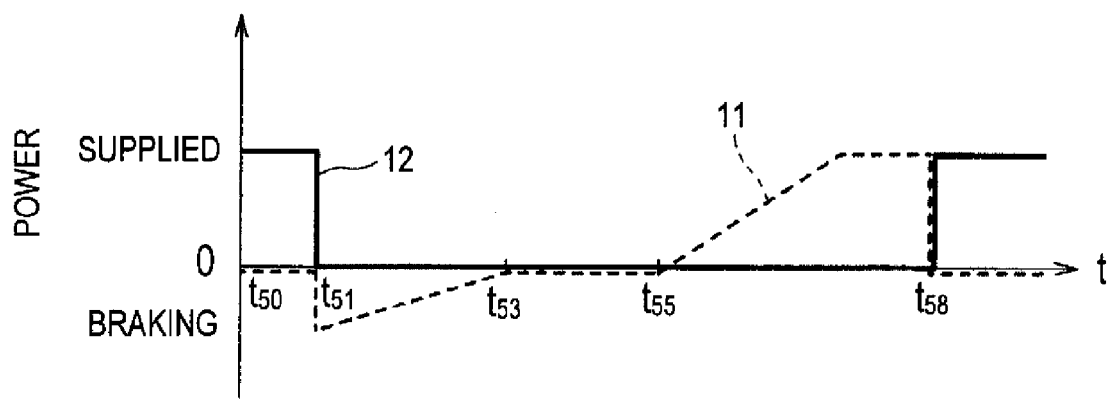
Figure 7D:
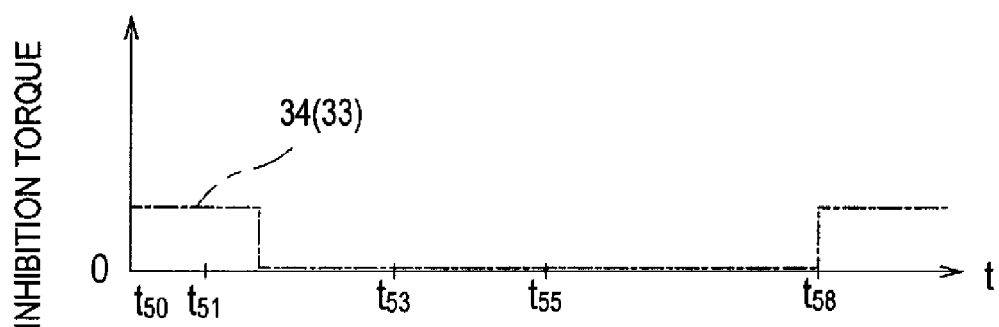

Time $t_{50}$ to time $t_{51}$ shown in FIGS. 7B to 7D correspond to the time $t_{40}$ to the time $t_{41}$ shown in FIGS. 6A to 6D, and the time $t_{51}$ to time $t_{53}$ shown in FIGS. 7A to 7D correspond to the time $t_{41}$ to the time $t_{43}$ shown in FIGS. 6A to 6D. The time $t_{53}$ to time $t_{55}$ shown in FIGS. 7A to 7D correspond to after the time $t_{43}$ shown in FIGS. 6A to 6D and before the time $t_{11}$ shown in FIGS. 3A to 3D. Further, the time $t_{55}$ to time $t_{58}$ shown in FIGS. 7A to 7D correspond to the time $t_{11}$ to the time $t_{14}$ shown in FIGS. 3A to 3D, and after the time $t_{58}$ shown in FIGS. 7A to 7D corresponds to after the time $t_{14}$ shown in FIGS. 3A to 3D.

However, during the halt of the hybrid vehicle 4, the Stirling engine 12 operates in an idling state. The RPM of the Stirling engine 12 in the idling state is herein referred to as a third target RPM. The third target RPM is lower than the first target RPM.

Thus, when the hybrid vehicle 4 running at the first vehicle speed halts and then restarts and runs at the first vehicle speed, as shown in FIG. 7A, the RPM of the Stirling engine 12 decreases from the first target RPM to the third target RPM, and then increases from the third target RPM to the first target RPM.

Thus, the planetary gears 33, 33, . . . revolve rightward in a state where the RPM is constant at zero, and then revolve leftward and enters the state where the RPM is constant at zero.

Between the time $t_{50}$ and the time $t_{51}$ shown in FIGS. 7A to 7D, the hybrid vehicle 4 runs at the first vehicle speed similarly to between the time $t_{40}$ and the time $t_{41}$ in FIGS. 6A to 6D.

At this time, the CPU 20 repeatedly executes the processes in S13 to S15 shown in FIG. 10.

At the time $t_{51}$ shown in FIGS. 7A to 7D, the driver turns on the brake 44 and the hybrid vehicle 4 starts decreasing the vehicle speed.

At this time, the CPU 20 determines YES in S15 shown in FIG. 10, and executes the processes in S41 to S45 shown in FIG. 12.

Between the time $t_{51}$ and the time $t_{53}$ shown in FIGS. 7A to 7D, the driver continues turning on the brake 44.

At this time, the CPU 20 repeatedly executes the processes in S43 to S45 shown in FIG. 12.

At the time $t_{53}$ shown in FIGS. 7A to 7D, the driver turns off the brake 44, and until the time $t_{55}$, the driver does not operate either the accelerator 43 or the brake 44.

In this case, the vehicle speed of the hybrid vehicle 4 is zero.

At this time, the CPU 20 executes the processes in S46 to S51 shown in FIG. 12, and then repeatedly executes the processes in S13, S14 and S16 shown in FIG. 10.

At the time $t_{55}$ shown in FIGS. 7A to 7D, the driver turns on the accelerator 43 and the hybrid vehicle 4 starts increasing the vehicle speed.

At this time, the CPU 20 determines YES in S13 shown in FIG. 10, and executes the processes in S18 to S22.

Between the time $t_{55}$ and the time $t_{57}$ shown in FIGS. 7A to 7D, the driver continues turning on the accelerator 43.

At this time, the CPU 20 repeatedly executes the processes in S20 to S22 shown in FIG. 10.

At the time $t_{57}$ shown in FIGS. 7A to 7D, the driver turns off the accelerator 43, and the hybrid vehicle 4 runs at a constant speed required by the driver. After the time $t_{57}$, the driver maintains the accelerator 43 off and does not operate the brake 44.

At this time, the CPU 20 determines YES in S22 shown in FIG. 10, and executes the processes in S31 to S34 shown in FIG. 11. At the time $t_{58}$, the CPU 20 determines YES in S34. Further, after the time $t_{58}$, the CPU 20 executes the processes in S35 to S37 shown in FIG. 11, and then repeatedly executes the processes shown in S13 to S15.

As shown in FIGS. 7A and 9A, between the time $t_{51}$ and the time $t_{53}$, the worm gear 112 rotates rightward in a driving manner while decreasing the RPM, as shown in FIGS. 7A and 9C, between the time $t_{53}$ and the time $t_{55}$, the RPM of the worm gear 112 is constant at zero. As shown in FIGS. 7A and 8B, between the time $t_{55}$ and the time $t_{57}$, the power output by the motor 11 causes the worm gear 112 to rotate rightward in a driving manner while increasing the RPM, between the time $t_{57}$ and the time $t_{58}$, the power output by the motor 11 causes the worm gear 112 to rotate rightward in a driving manner at the first target RPM. After the time $t_{58}$, as shown in FIGS. 7A and 8C, the worm gear 112 rotates rightward in a driven manner with the rotation of the ring gear 31.

As shown in FIG. 7A, between the time $t_{51}$ and the time $t_{52}$, the power output by the Stirling engine 12 causes the sun gear 32 to rotate at the first target RPM, between the time $t_{52}$ and the time $t_{54}$, the RPM decreases, and between the time $t_{54}$ and the time $t_{57}$, the sun gear 32 continues rotating at the third target RPM.

Between the time $t_{57}$ and the time $t_{58}$, the power output by the Stirling engine 12 increases the RPM of the sun gear 32, and after the time $t_{58}$, the RPM becomes constant at the first target RPM.

From the above, as shown in FIGS. 7A and 9A, between the time $t_{51}$ and the time $t_{52}$, braking by the rotation in a driving manner of the worm gear 112 causes the ring gear 31 to rotate leftward while decreasing the RPM. With the rotation of the ring gear 31, the reduction gear 251 rotates rightward in a driven manner.

With decreasing RPM of the ring gear 31, the RPM of the ring gear 31 becomes lower than the RPM of the sun gear 32. The RPM of the sun gear 32 is constant. Thus, the planetary gears 33, 33, . . . rotate leftward, and revolve rightward while increasing the negative RPM.

As shown in FIGS. 7A and 9A, between the time $t_{52}$ and the time $t_{53}$, braking by the rotation in a driving manner of the worm gear 112 causes the ring gear 31 to rotate leftward while decreasing the RPM. With the rotation of the ring gear 31, the reduction gear 251 rotates rightward in a driven manner.

At this time, the RPMs of the ring gear 31 and the sun gear 32 decrease. Thus, the planetary gears 33, 33, . . . rotate leftward and revolve rightward at a constant RPM.

As shown in FIGS. 7A and 9C, between the time $t_{53}$ and the time $t_{54}$, the operation of the motor 11 is stopped, and with the rotation stop of the worm gear 112, the ring gear 31 stops rotation. With the rotation stop of the ring gear 31, the reduction gear 251 stops rotation.

The RPM of the sun gear 32 further decreases, and a difference from the RPM of the ring gear 31 becomes smaller. Thus, the planetary gears 33, 33, . . . rotate leftward, and revolve rightward while decreasing the negative RPM.

Further, as shown in FIGS. 7A and 9C, between the time $t_{54}$ and the time $t_{55}$, the RPM of the sun gear 32 is constant at the third target RPM.

At this time, the RPMs of the ring gear 31 and the sun gear 32 are constant. Thus, the planetary gears 33, 33, . . . rotate leftward, and revolve rightward at a constant RPM.

Further, as shown in FIG. 7A, between the time $t_{55}$ and the time $t_{57}$, the RPM of the sun gear 32 is constant at the third target RPM. The worm gear 112 rotates rightward in a driving manner while increasing the RPM. With the rotation of the worm gear 112, the ring gear 31 rotates leftward in a driven manner. Further, with the rotation of the ring gear 31, the reduction gear 251 rotates rightward in a driven manner.

Between the time $t_{55}$ and the time $t_{56}$, the RPM of the sun gear 32 is higher than the RPM of the ring gear 31, and thus as shown in FIGS. 7A and 9A, the planetary gears 33, 33, . . . rotate leftward, and revolve rightward while decreasing the negative RPM.

At the time $t_{56}$, the RPMs of the ring gear 31 and the sun gear 32 become equal, and thus the planetary gears 33, 33, . . . rotate leftward, and instantaneously stop revolution.

Between the time $t_{56}$ and the time $t_{57}$, the RPM of the ring gear 31 is higher than the RPM of the sun gear 32, and thus as shown in FIGS. 7A and 8B, the planetary gears 33, 33, . . . rotate leftward, and revolve leftward while increasing the RPM.

Further, as shown in FIGS. 7A and 8B, between the time $t_{57}$ and the time $t_{58}$, the RPM of the ring gear 31 is constant at the first target RPM. Meanwhile, the RPM of the sun gear 32 increases. Thus, the planetary gears 33, 33, . . . rotate leftward, and revolve leftward while decreasing the RPM.

At the time $t_{58}$, the RPM of the planetary gears 33, 33, . . . becomes zero.

Further, as shown in FIGS. 7A and 8C, after the time $t_{58}$, the RPMs of the ring gear 31 and the sun gear 32 are constant at the first target RPM. The planetary gears 33, 33, . . . rotate leftward but do not revolve (that is, the RPM is constant at zero).

Timing when the revolution of the planetary gears 33, 33, . . . is switched from permission to inhibition is the time $t_{14}$, the time $t_{24}$, the time $t_{34}$, and the time $t_{58}$. In other words, the timing when the revolution of the planetary gears 33, 33, . . . is switched from permission to inhibition is timing when the RPM of the planetary gears 33, 33, . . . permitted to revolve becomes zero when the RPM of the ring gear 31 is constant at a positive number.

Thus, the hybrid vehicle driving system 1 may be configured to measure timing when the revolution of the planetary gears 33, 33, . . . is switched from permission to inhibition based on the RPMs of the ring gear 31 and the planetary gears 33, 33, . . . .

In this embodiment, the supplied torque output by the motor 11 and the inhibition torque applied to the planetary carrier 34 are suddenly switched from the positive number to zero. In this case, decreasing gradients of the supplied torque and the inhibition torque are extremely large, which may cause an impact. Thus, it is desired to control to decrease the decreasing gradients of the supplied torque and the inhibition torque (that is, smoothly switch the supplied torque and the inhibition torque from the positive number to zero).

The hybrid vehicle driving system 1 and the hybrid vehicle 4 as described above can drive the wheels 41 and 41 selectively using the power output by the motor 11 and the power output by the Stirling engine 12 with a simple configuration and simple control.

More specifically, when sudden output adjustment is required, the wheels 41 and 41 can be driven by the power output by the motor 11. When the sudden output adjustment is not required, the wheels 41 and 41 can be driven by the power output by the Stirling engine 12. Further, when the wheels 41 and 41 are driven by the negative power output by the motor 11, the motor 11 can be operated as the generator to recover the electric power generated by the motor 11 in the rechargeable battery 15.

Thus, the advantage of the motor 11 of the high reaction rate of the output adjustment can compensate for the disadvantage of the Stirling engine 12 of the low reaction rate of the output adjustment. Also, noise due to combustion is lowered, a wide choice of types and forms of fuel are accepted, and combustion under an optimum condition is allowed, thereby providing an advantage of the Stirling engine 12 of easily reducing exhaust of air pollutants. Also, the motor 11 can be allowed to function as a regenerative brake.

Further, the motor 11 and the Stirling engine 12 can each be used as the power sources for driving the wheels 41 and 41. Thus, unlike the conventional electric vehicle, there is no loss for the power output by the external combustion engine to be once converted into electric power. Specifically, the power output by the external combustion engine can be efficiently used.

It should be construed that the disclosed embodiment is exemplary in all aspects and not restrictive. The scope of the present disclosure includes not only the above-described meanings but also meanings equivalent to the claims and all changes within the claims.

The hybrid vehicle driving system 1 or the hybrid vehicle 4 may include components that are not disclosed in the embodiment.

What is claimed is:

1. A hybrid vehicle driving system comprising:
    an electric motor;
    an external combustion engine; and
    a power transmission section configured to selectively transmit power output by one of the external combustion engine and the electric motor to a wheel,
    wherein the electric motor is mechanically coupled to the power transmission section via a first gear and the external combustion engine is mechanically coupled to the power transmission section via a second gear;
    wherein the power transmission section comprises:
        an output calculation device configured to calculate an output value to be output by the external combustion engine depending on power to be transmitted to the wheel;
        an output comparison device configured to compare the calculated output value to a detected current output value of the external combustion engine; and
        a power selection device configured to select power to be transmitted to the wheel according to a difference between the calculated output value and the detected current output value output of the external combustion engine.

2. The hybrid vehicle driving system according to claim 1, wherein the output comparison device compares the difference between the calculated output value and the detected current output value output by the external combustion engine to a predetermined threshold,
    the power selection device selects power output by the external combustion engine as power to be transmitted to the wheel when the difference between the calculated output and the detected current output value output by the external combustion engine is equal to or less than the predetermined threshold, and
    the power selection device selects power output by the electric motor as power to be transmitted to the wheel when the comparison result of the output comparison device shows that a first subtraction result obtained by subtracting the detected current output value output by the external combustion engine from the calculated output value is larger than the predetermined threshold.

3. The hybrid vehicle driving system according to claim 2, wherein the power selection device selects power output by the electric motor as power to be transmitted to the wheel when the difference between the calculated output value and the detected current output value output by the external combustion engine shows that the first subtraction result obtained by subtracting the detected current output value output by the external combustion engine from the calculated output value is larger than the predetermined threshold.

4. The hybrid vehicle driving system according to claim 2, wherein the power selection device selects power output by the electric motor as power to be transmitted to the wheel when the difference between the calculated output value and the detected current output value output by the external combustion engine shows that a second subtraction result obtained by subtracting the calculated output value from the detected current output value output by the external combustion engine is larger than the predetermined threshold.

5. The hybrid vehicle driving system according to claim 2, wherein the power selection device selects power output by the electric motor as power to be transmitted to the wheel, and controls the electric motor so as to operate as a generator when the difference between the calculated output value and the detected current output value output by the external combustion engine shows that a second subtraction result obtained by subtracting the calculated output value from the detected current output value output by the external combustion engine is larger than the predetermined threshold.

6. The hybrid vehicle driving system according to claim 1, wherein the power transmission section further comprises:
   a planetary gear mechanism using the first gear to which the power output by the electric motor is transmitted, the second gear to which the power output by the external combustion engine is transmitted, and a third gear configured to transmit the power transmitted to the second gear to the first gear during rotation stop or rotational movement stop; and
   a switching portion configured to switch rotation or rotational movement of the third gear on/off,
   the power transmitted to the first gear is transmitted to the wheel, and
   the power selection device controls the switching portion so as to stop the rotation or the rotational movement of the third gear and controls the electric motor so as to stop the output of the power when selecting the power output by the external combustion engine as the power to be transmitted to the wheel, and
   the power selection device controls the switching portion so as to cause the rotation or the rotational movement of the third gear and controls the electric motor so as to output the power when selecting the power output by the electric motor as the power to be transmitted to the wheel.

7. The hybrid vehicle driving system according to claim 1, further comprising a generator that is interlocked with the external combustion engine and generates electric power to be supplied to the electric motor.

8. The hybrid vehicle driving system according to claim 1, wherein the current output value output by the external combustion engine represents at least one of a desired rotations per minute (RPM) of the external combustion engine and a desired torque of external combustion engine.

9. The hybrid vehicle driving system according to claim 1, wherein the power transmission section further comprises:
   a generator mechanically coupled to the external combustion engine in parallel with the second gear, to generate electrical power.

10. The hybrid vehicle driving system according to claim 1, wherein the power transmission section further comprises:
    a gear mechanism; and
    a switching portion to control operation of the gear mechanism.

11. The hybrid vehicle driving system according to claim 1, further comprising an engine sensor configured to detect the detected current output value of the external combustion engine.

12. The hybrid vehicle driving system according to claim 1, wherein the output comparison device is configured to compare the calculated output value of only the external combustion engine to the detected current output value of only the external combustion engine; and
    the power selection device is configured to select power to be transmitted to the wheel according to the difference between the calculated output value of only the external combustion engine and the detected current output value output by only the external combustion engine.

13. A hybrid vehicle comprising:
    a hybrid vehicle driving system comprising:
       an electric motor;
       an external combustion engine; and
       a power transmission section configured to selectively transmit power output by one of the external combustion engine and the electric motor to a wheel; and
    wherein the wheel is configured to be driven by the hybrid vehicle driving system;
    wherein the electric motor is mechanically coupled to the power transmission section via a first gear and the external combustion engine is mechanically coupled to the power transmission section via a second gear; and
    wherein the power transmission section comprises:
       an output calculation device configured to calculate an output value to be output by the external combustion engine depending on power to be transmitted to the wheel;
       a sensor configured to detect a current output value of the external combustion engine;
       an output comparison device configured to compare the calculated output value to the current output value output by the external combustion engine; and
       a power selection device configured to select power to be transmitted to the wheel according to a difference between the calculated output value and the detected current output value output of the external combustion engine.

14. The hybrid vehicle driving system according to claim 13, wherein the current output value output by the external combustion engine represents at least one of a desired rotations per minute (RPM) of the external combustion engine and a desired torque of external combustion engine.

15. The hybrid vehicle driving system according to claim 13, wherein the power transmission section further comprises:
    a generator mechanically coupled to the external combustion engine in parallel with the second gear, to generate electrical power.

16. The hybrid vehicle driving system according to claim 13, wherein the power transmission section further comprises:
    a gear mechanism; and
    a switching portion to control operation of the gear mechanism.

17. A method for driving a driving system including an electric motor that is mechanically coupled to a power transmission section via first gear, an external combustion engine, and the power transmission section configured to selectively transmit power output by one of the external combustion engine and the electric motor to a wheel, the method comprising:
    calculating, by the power transmission section, an output value to be output by the external combustion engine depending on power to be transmitted to the wheel, wherein the external combustion engine is mechanically coupled to the power transmission section via a second gear;
    detecting, by an engine sensor, a current output value output by the external combustion engine;
    comparing, by an output comparison device of the power transmission section, the calculated output value to the current output value output by the external combustion engine; and selecting, by the power transmission section, power to be transmitted to the wheel according to a difference between the calculated output value and the detected current output value output of the external combustion engine.

18. The method of claim 17, wherein the current output value output by the external combustion engine represents at least one of a desired rotations per minute (RPM) of the external combustion engine and a desired torque of external combustion engine.

19. The method of claim 17, further comprising:
generating electrical power by a generator mechanically coupled to the external combustion engine in parallel with the second gear.

20. The method of claim 17, further comprising:
comparing the difference between the calculated output value and the detected current output value by the external combustion engine with a predetermined threshold;
selecting power output by the external combustion engine as power to be transmitted to the wheel if the difference between the calculated output value and the detected current output value output by the external combustion engine is equal to or less than the predetermined threshold;
selecting power output by the electric motor as power to be transmitted to the wheel when a first subtraction result obtained by subtracting the detected current output value output by the external combustion engine from the calculated output value is greater than the predetermined threshold value.

21. The method of claim 20, further comprising:
selecting power output by the electric motor as power to be transmitted to the wheel when a second subtraction result obtained by subtracting the calculated output value from the detected current output value output by the external combustion engine is larger than the predetermined threshold.

22. The method of claim 20, further comprising:
selecting power output by the electric motor as power to be transmitted to the wheel; and
controlling the electric motor so as to operate as a generator when a second subtraction result obtained by subtracting the calculated output value from the detected current output value output by the external combustion engine is larger than the predetermined threshold.

* * * * *